(12) United States Patent  (10) Patent No.: US 6,814,332 B2
Eason  (45) Date of Patent: Nov. 9, 2004

(54) MICROPHONE SUPPORT BOOM MOVEMENT CONTROL APPARATUS AND METHOD WITH DIFFERENTIAL MOTION ISOLATION CAPABILITY

(75) Inventor: Donald H. Eason, Fort Collins, CO (US)

(73) Assignee: Ultimate Support Systems, Inc., Fort Collins, CO (US)

( * ) Notice: Subject to any disclaimer, the term of this patent is extended or adjusted under 35 U.S.C. 154(b) by 0 days.

(21) Appl. No.: 10/345,622

(22) Filed: Jan. 15, 2003

(65) Prior Publication Data

US 2004/0135040 A1 Jul. 15, 2004

(51) Int. Cl.[7] ............................ A47F 5/00; F16M 13/00
(52) U.S. Cl. ..................................... 248/122.1; 381/386
(58) Field of Search ............................ 248/122.1, 121, 248/124.1, 124.2, 125.7, 125.9, 181.1, 181.2, 183.1, 183.2, 186.2, 288.31, 288.51, 278.1, 289.11, 291.1, 179.1, 186.1, 176.1; 381/361, 386

(56) References Cited

U.S. PATENT DOCUMENTS

| 1,697,710 | A |   | 1/1929  | Bostroem |
| 1,735,212 | A | * | 11/1929 | Pawsat ................. 248/229.24 |
| 1,942,925 | A | * | 1/1934  | Jenkins .................. 248/123.2 |
| 2,271,194 | A | * | 1/1942  | Ingwer et al. .......... 248/122.1 |
| 2,532,173 | A | * | 11/1950 | Lewis ........................ 248/413 |
| 2,548,650 | A |   | 4/1951  | Brandt |
| 3,153,123 | A | * | 10/1964 | Harman ..................... 381/363 |
| 3,324,254 | A |   | 6/1967  | Shaw et al. |
| 3,621,156 | A |   | 11/1971 | Kliewer |
| 3,924,083 | A | * | 12/1975 | Feldman et al. ....... 219/121.69 |
| 4,047,684 | A |   | 9/1977  | Kobayashi |
| 4,671,478 | A | * | 6/1987  | Schoenig et al. ........ 248/124.1 |
| 4,760,984 | A |   | 8/1988  | Hennessey |
| 4,767,231 | A | * | 8/1988  | Wallis ......................... 403/56 |
| 5,154,381 | A |   | 10/1992 | Malinao |
| 5,449,138 | A | * | 9/1995  | Ciancio ................... 248/123.2 |
| 6,027,257 | A |   | 2/2000  | Richards et al. |
| 6,277,048 | B1|   | 8/2001  | Rohs |
| 6,610,916 | B1| * | 8/2003  | Torrez ......................... 84/421 |
| 2002/0186998 | A1 | * | 12/2002 | Chen et al. ................... 403/97 |

FOREIGN PATENT DOCUMENTS

| GB | 2047323 A | * | 11/1980 |
| GB | 2385517 A | * | 8/2003 |
| SE | 151769 A | * | 10/1955 |

OTHER PUBLICATIONS

Cullman Universal Tripods; www.rtsphoto.com/html/cullm3.html.
K & M 21160 Boom Arm; www.trc.com.au/KM_boom.htm and www.k-m.de/D/Katalog/mikrofon/5index.asp?spr=EN.
MSA 7020TB Top Mounted Tele-Boom; Micguys.com; www.micguys.com/stands/stands_msa-7020tb.com.
Mic Swivel for SB-36W Boom; Black Audio Devices; www.blackaudio.com/atlaspts.htm.
Ultimate Bicycle Support 2001/2002 Catalog; 8 pages.

* cited by examiner

Primary Examiner—Anita M. King
(74) Attorney, Agent, or Firm—Santangelo Law Offices, P.C.

(57) ABSTRACT

Apparatus for and associated methods of controlling movement of a microphone that may be held in some manner by a microphone support boom. More specifically, the invention focuses upon novel techniques for isolating yaw of a microphone support boom from the microphone stand that may provide a majority of the height required for a desired microphone spatial positioning. The invention also focuses on apparatus that may be used achieve preferential isolation of microphone support boom yaw with respect to motion in any other microphone support boom degree of freedom. A specific type of apparatus that may be used to achieve this preferential isolation—the double conical clutch—is also an aspect of the inventive technology.

59 Claims, 13 Drawing Sheets

MICROPHONE SUPPORT BOOM MOVEMENT CONTROL APPARATUS AND METHOD WITH DIFFERENTIAL MOTION ISOLATION CAPABILITY

BACKGROUND OF THE INVENTION

Generally, this invention relates to apparatus for and associated methods of controlling movement of a microphone that may be held in some manner by a microphone support boom. More specifically, the invention focuses upon novel techniques for isolating yaw of the microphone support boom from the microphone stand that may provide a majority of the height required for a desired microphone spatial positioning. The invention also focuses on apparatus that may be used achieve preferential isolation of microphone support boom yaw with respect to motion in any other microphone support boom degree of freedom. A specific type of apparatus that may be used to achieve this preferential isolation—the double conical clutch—is also an aspect of the inventive technology.

The desire to control motion of a microphone retained in a microphone support assembly has been known for some time. Typically, such a microphone support assembly might include a microphone stand having a support base that contacts an underlying surface such as a stage or floor, and a microphone support boom attached at the upper end of the microphone stand (either directly or through a intermediate apparatus to which an attacher is itself attached). However, the microphone stand might not be present, as the microphone support boom may instead be attached (either directly or via an intermediate apparatus to which an attacher is itself attached) to a surface (typically an elevated surface such as the top front of a piano, as but one example) One end of the microphone support boom typically is adapted to retain or hold in some manner a microphone, which a user would desire to have positioned in an optimal position. This optimal position may change during the course of the musical performance or speech (as but two examples), as performance or other demands may dictate. For example, the user (i.e., the person creating the noise that is to be amplified) may complete a singing part and want the microphone repositioned to a less obstructive area (but perhaps one that is still reachable) while the user plays an instrument (which may be amplified by means other than the microphone nearest the user). Importantly, it may be very important to the user in order to not disrupt the performance that the microphone be repositioned such that it may be quickly and easily returned to its initial position (likely an optimally set initial position) with minimal manipulation by the user. Ideally, this repositioning of the retained microphone will be to a new position that is readily graspable by the user so that it may be easily returned by the user (or a proximate assistant) to its initial position and in a manner that causes minimal disruption to the user and his or her performance.

Typically, such minimally disruptive repositioning takes the form of manually induced yaw of the microphone support boom (typically yaw is rotation about a vertical axis). Of course it would be desired to induce such yaw without also moving in any manner the microphone stand. However, using heretofore existing microphone movement control apparatus, only some of the systems allow in any manner yaw movement. With regard to these selected prior systems, the only way to assure that the provision of yaw capability of the microphone support boom would not result in an increased risk of compromising the structural integrity of the assembly (e.g., by unscrewing the boom from the microphone stand) would be to disengage any part of the stand that might exist to enable vertical extension of the stand so that the microphone may be positioned at a desired height. Upon such disengagement, the stand would not be height-adjustable and would typically be at its lowest position (thus not situating the retained microphone at the desired height and requiring an elevated support surface on which the stand base might sit to achieve a desired height). Also, even if the disengagement of the height adjustment mechanism is temporary, the user must inconveniently hold the upper part of the microphone stand (or the microphone support boom) in one hand after disengaging the height adjustment mechanism while using the other to "yaw-adjust" the microphone to the desired orientation. Further, with some tall microphone stands, the height adjust may be in a position inaccessible by the user. In order to provide for yaw rotation of the microphone support boom) relative to the microphone stand (so as to avoid having to rotate the stand while yaw rotating the boom) while precluding loss of any microphone stand height adjustment capability that might exist, heretofore existing microphone support assemblies that even allowed any sort of yaw rotation (however inconvenient or make-shift) required that any connection of the microphone support boom to the microphone support stand would need to be only partially engaged. For instance, threaded attachments can not be fully engaged in previously existing systems, if a user is to have yaw capability and an intact microphone stand height adjustment capability. Of course, these previously existing "free floating" systems risk unscrewing and resulting disassembly of the microphone support boom from the microphone stand, and, at the very least, render unachievable the secure connection afforded by a fully engaged connection (such as a threaded bolt fully turned into a nut or other threaded receptacle). A jamb nut may be used to reduce the risk of unscrewing, but such a system compromises the yaw provision (jamb nuts tend to have a locking effect on threadedly attached parts), does provide for the secure attachment otherwise provided by a full threaded engagement, does not avoid the problem of increased wear associated with inordinate rotation of threaded parts, results in increased vibration and thus noise in the amplified sound, requires an additional step of threading the jamb nut onto a projecting threaded part, and is simply one additional part that can be lost or become excessively worn.

An additional problem associated with previously existing microphone support systems includes control of only three degrees of freedom, and more particularly no provision of yaw. Relatedly, previously existing systems do not provide for control of yaw, including locking and releasing capability. Further, existing systems do not provide semi- or partially locked capability of motion. Relatedly, there are no systems that provide differential releasing capability that might include an adjustable part usable by a user to first provide for yaw of the microphone support boom before providing for any other type of motion (such as pitch or axial translation or rotation of the microphone support boom). Ball joints simply are not usable to achieve such differential release or isolation, as they release motion in several rotational degrees of freedom simultaneously upon sufficient decompression, e.g. Indeed, in such a system, often the instant the boom might be sufficiently decompressed to allow for a desired yaw, the leverage caused by the weight of the boom and microphone would also cause an undesired pitch of the microphone and boom). Differential releasing or isolating capability would be valuable to a user desiring to laterally move the microphone (accomplished by causing yaw of its support boom) without causing pitch or any axial motion of the boom.

An additional problem associated with previously existing systems simply includes inconvenience associated with detaching an attaching a microphone support boom to a microphone stand. This inconvenience takes two forms—the lack of a simple one-step procedure to detach or attach the boom to the stand, and the requirement that, in order to attach the two with a minimum number of steps and in the most uncomplicated fashion (as might be the only apparent or obvious manner of attaching the two to a performer who is unfamiliar with any usage particularities and features of the device), the microphone be attached (when retained in any boom retention apparatus) by "helicoptered" the boom around the microphone stand axis. This is simply an inconvenient, time consuming and often awkward step.

SUMMARY OF THE INVENTION

The present invention includes a variety of aspects that may be selected in different combinations based upon the particular application or needs to be addressed. In one basic form, the invention relates to a microphone support boom movement control apparatus and related methods that enable attachment of the microphone support boom to a microphone stand in an obvious, readily apparent manner that does not involve helicoptering of the boom. In another basic form, the invention involves methods and apparatus that enable yaw of the microphone support boom relative to a microphone stand or an attachment device that connects the boom to the stand without requiring either that the attachment device only incompletely engage the stand or that any microphone stand vertical extension provision apparatus be loosened or disengaged. In another basic form is the provision of a microphone boom control apparatus that enables control (as by enabling locking and releasing) of a microphone boom (and of course any attached microphone) movement in four degrees of freedom. In yet another basic form the invention provides a microphone boom control apparatus that enables control of microphone boom yaw, including locking and releasing (or freeing). In still another basic form is differential release or isolation capability of motion of the microphone support boom in differing degrees of freedom. As used herein, the term isolation is to refer to rendering independent the referenced feature (typically a motion in a certain degree of freedom) from the microphone support boom, unless indicated otherwise. In at least one embodiment of the invention, the differential release capability is achieved by use of dual conical clutch with frictive surfaces having angles that may be selected to predictably amplify a horizontal friction force so that a related normal force, and thus a frictional force, can be predictably achieved. Thus, manipulation of the relative values of the frictional force incident on surfaces that govern motion in two different degrees of freedom can be used to control, to some extent at least, which motion will release from the static braking configuration first.

It is an object of the invention to provide a differential release capability to a microphone support boom movement control apparatus so that, in a semi-locked or incomplete microphone support boom retention setting, yaw may be provided for and achieved without also enabling pitch or other undesired degree of freedom motion.

It is an object of the invention to provide a controllable yaw in a microphone support boom control apparatus.

It is an object of the invention to provide four controllable degrees of freedom in a microphone support boom control apparatus.

It is an object of the invention to provide for isolation of yaw of an attachment element relative to a microphone stand to which it is to be attached so that "helicoptering" is not required during attachment.

It is an object of the invention to provide a single control (as by one rotatable knob, e.g.) for convenient attachment and detachment of a microphone support boom from a microphone stand.

It is an object of the invention to provide a double conical clutch that is usable to achieve differential release of motion in one degree of freedom relative to motion in a different degree of freedom.

It is an object of the invention to provide a preferential release or isolation of yaw relative to a microphone stand and or an attachment element.

It is an object of the invention to enable yaw isolated from the microphone stand and/or boom-to-stand attachment device without requiring that the attachment device be in an incomplete engagement setting and without requiring disengagement of a microphone stand height extender.

Naturally, further objects of the invention are disclosed throughout other areas of the specification and claims

BRIEF DESCRIPTION OF THE DRAWINGS

The following figures are examples of embodiments only and are not to be construed in any manner so as to limit the scope of the inventive subject matter.

A microphone support boom movement control apparatus comprising:

a microphone support boom multiple degree of freedom motion control element

Figure 1:
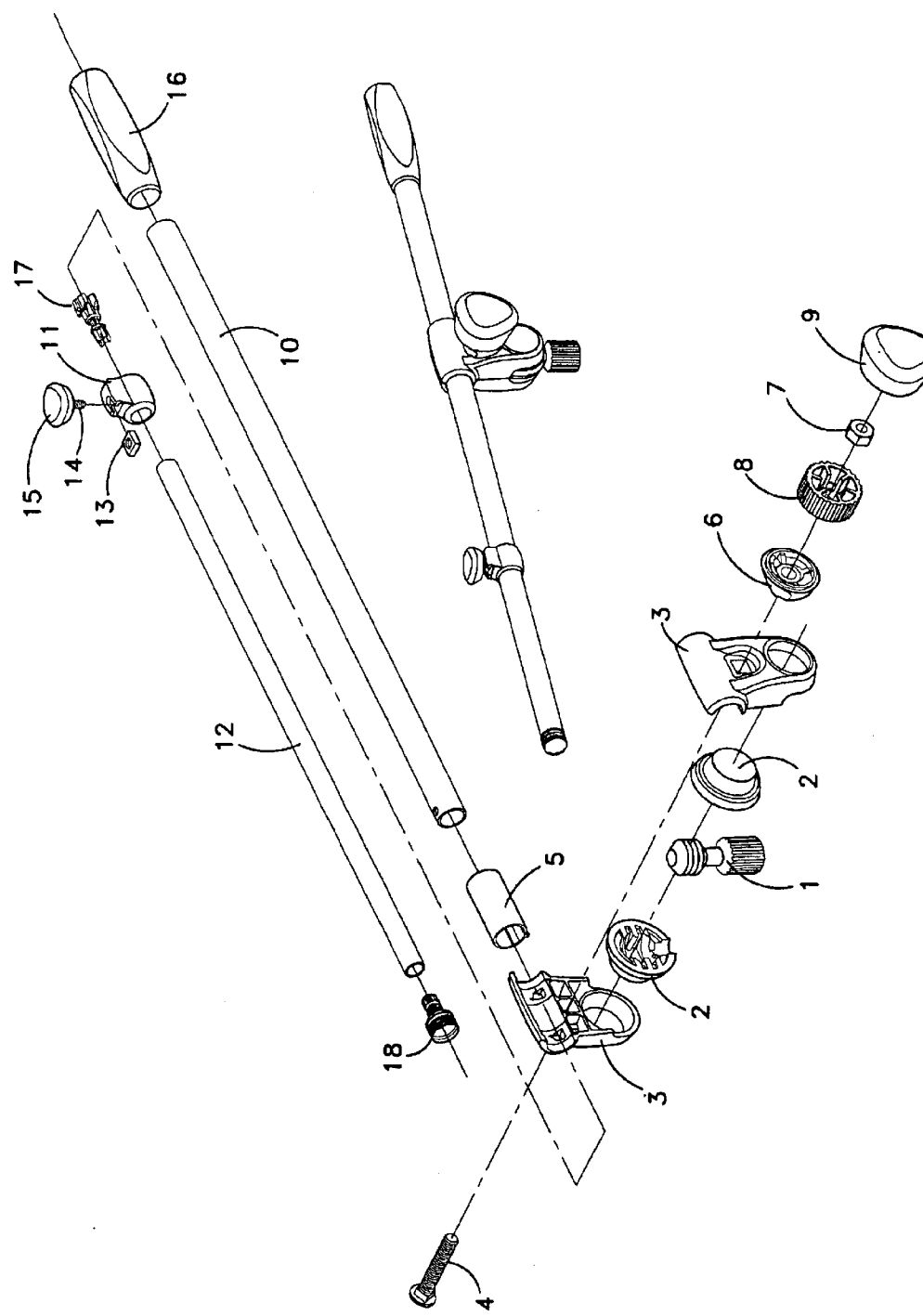

FIG. 1 shows an exploded perspective view of a microphone support boom movement control apparatus and a microphone support boom.

Figure 2:
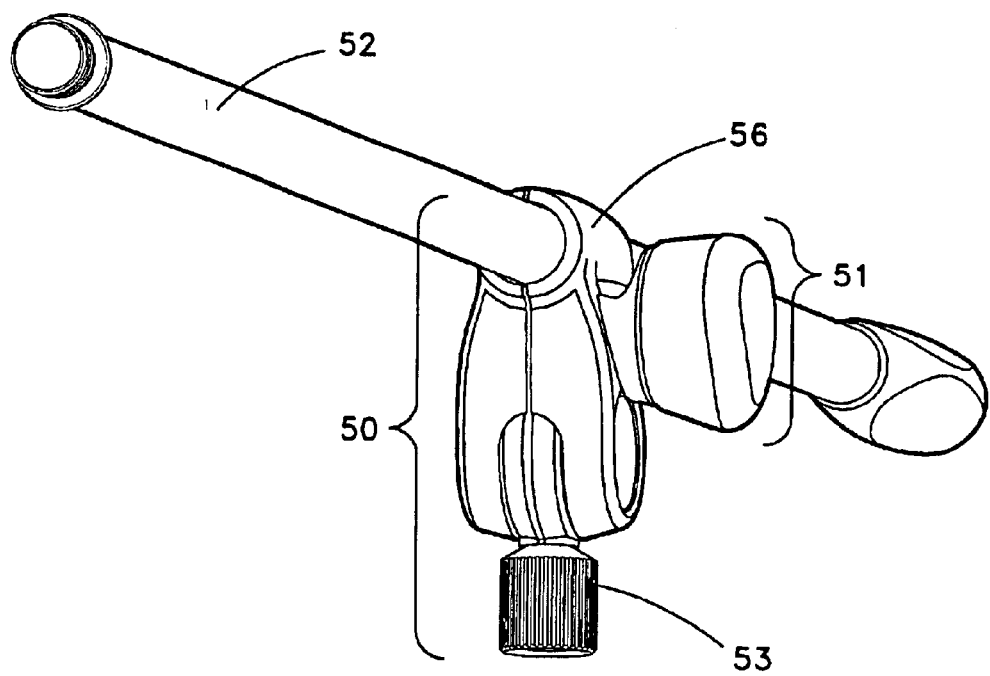

FIG. 2 shows a perspective view of a microphone support boom movement control apparatus and a microphone support boom.

Figure 3:
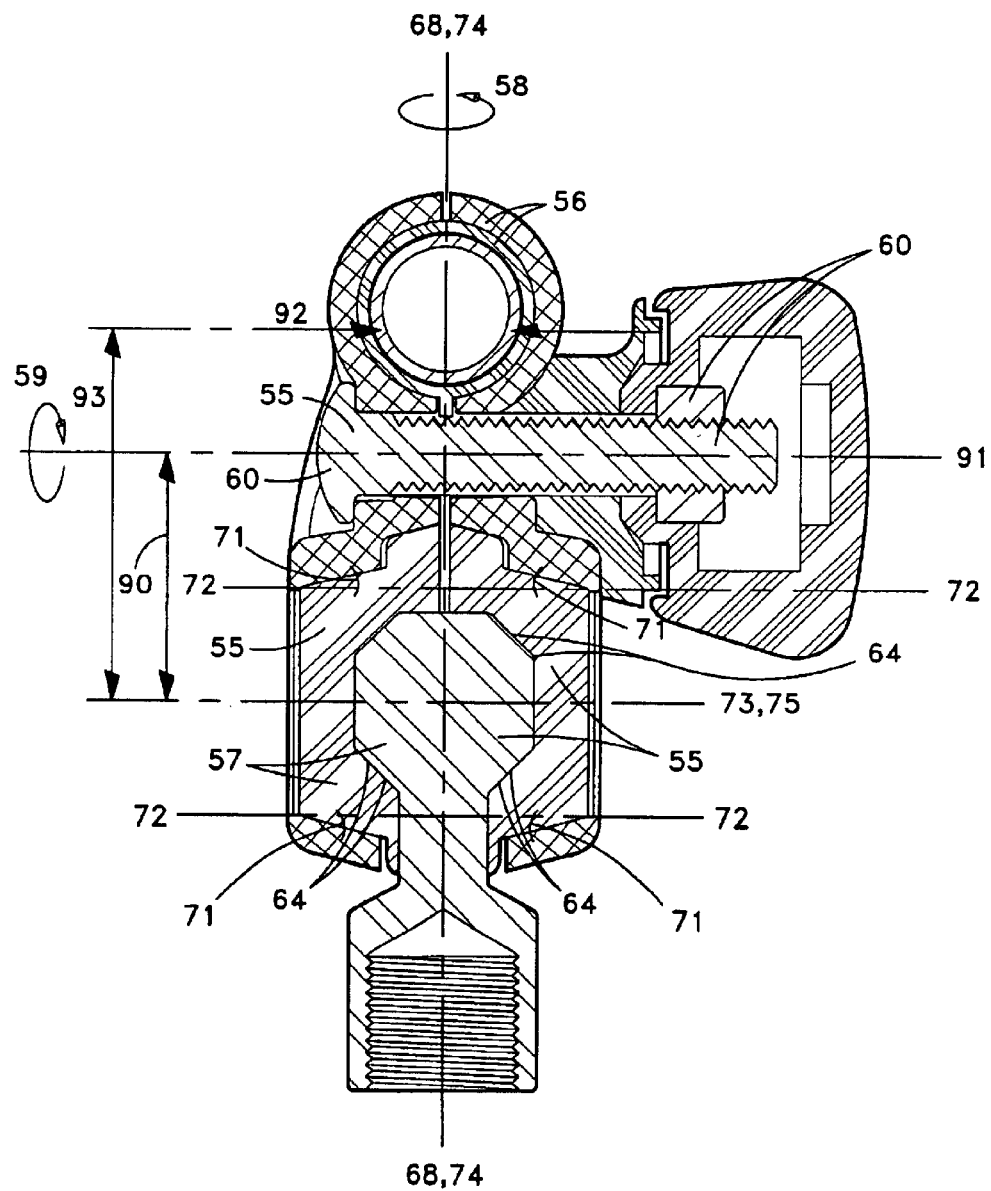

FIG. 3 shows a microphone support boom movement control apparatus and a microphone support boom as viewed along a retained boom axis in bisected cut-away view.

Figure 4:
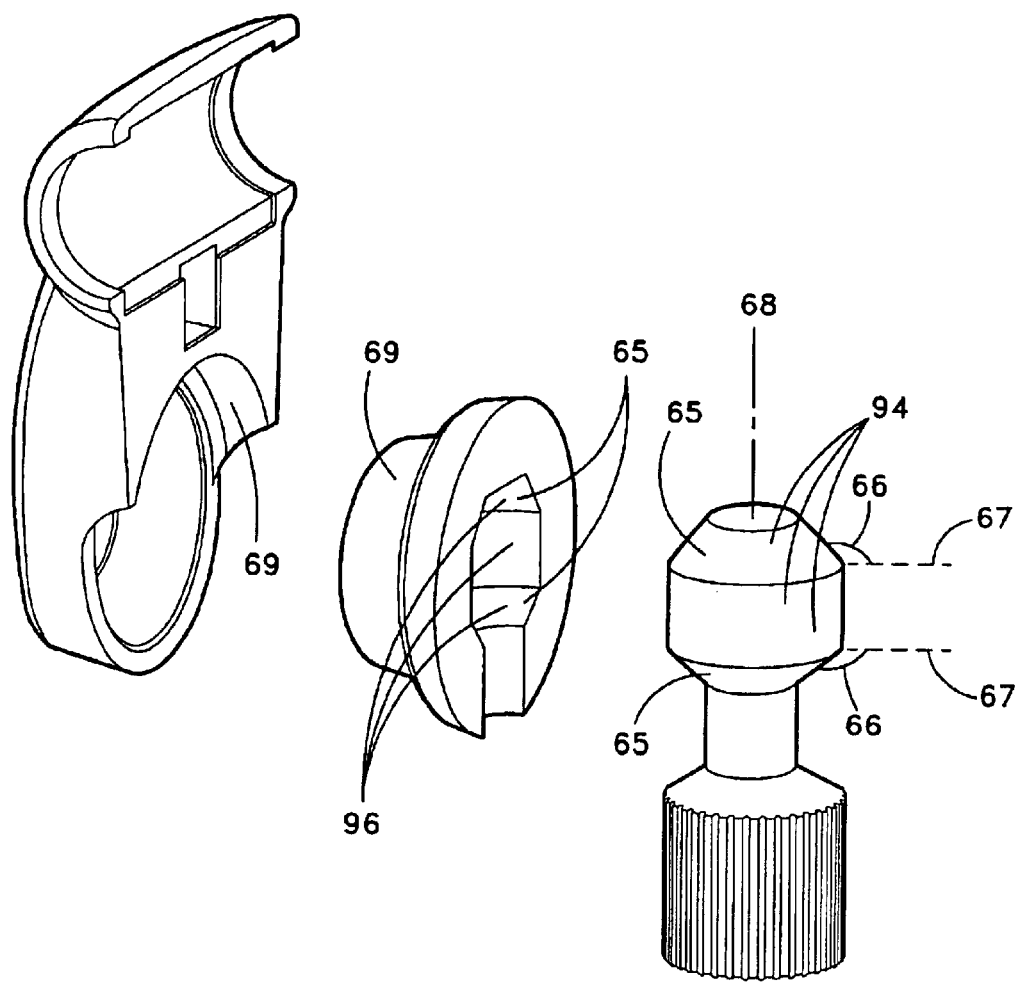

FIG. 4 shows a perspective exploded view of a certain parts of an approximate half of a microphone support boom movement control apparatus.

Figure 5:
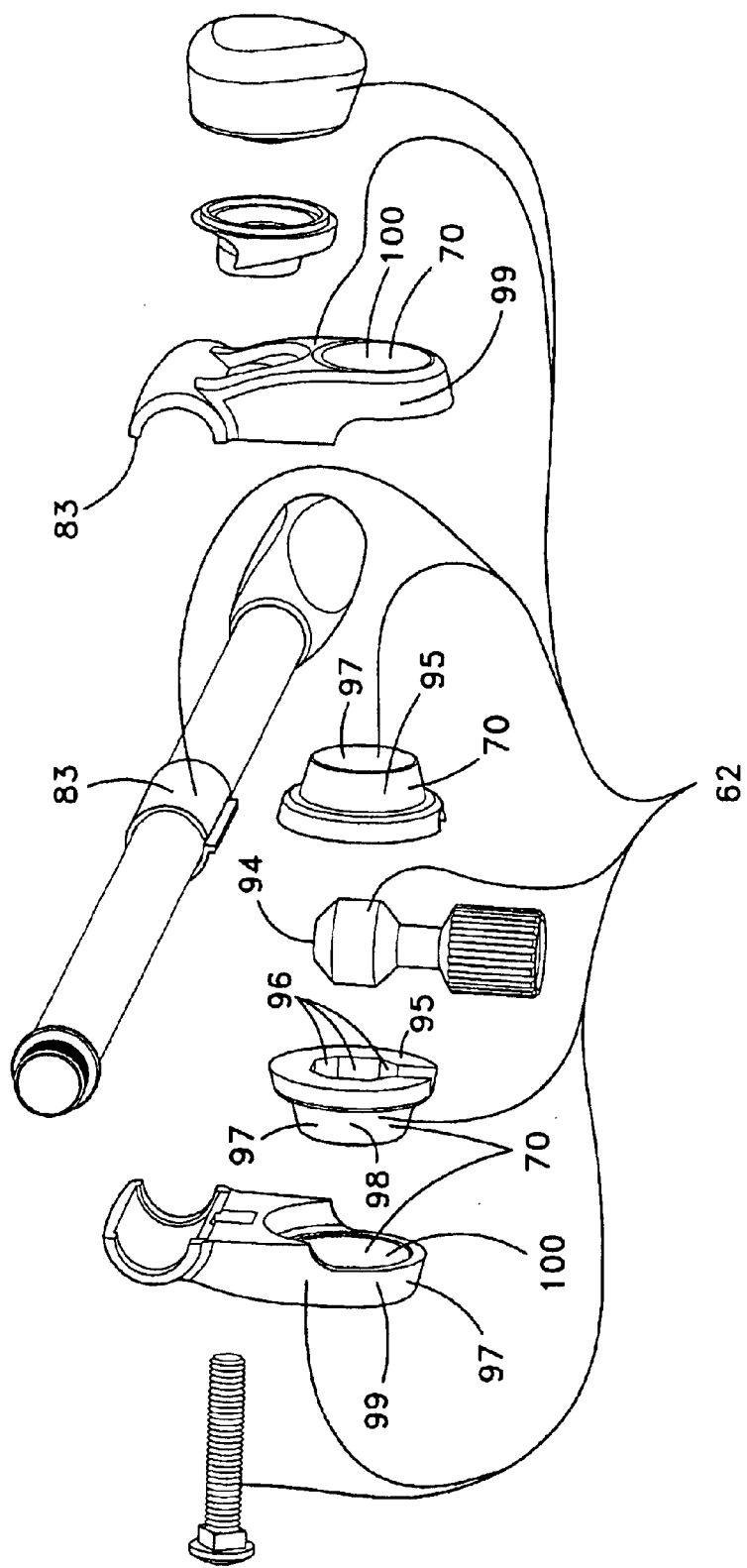

FIG. 5 shows an exploded perspective view of a microphone support boom movement control apparatus and a microphone support boom.

Figure 6:
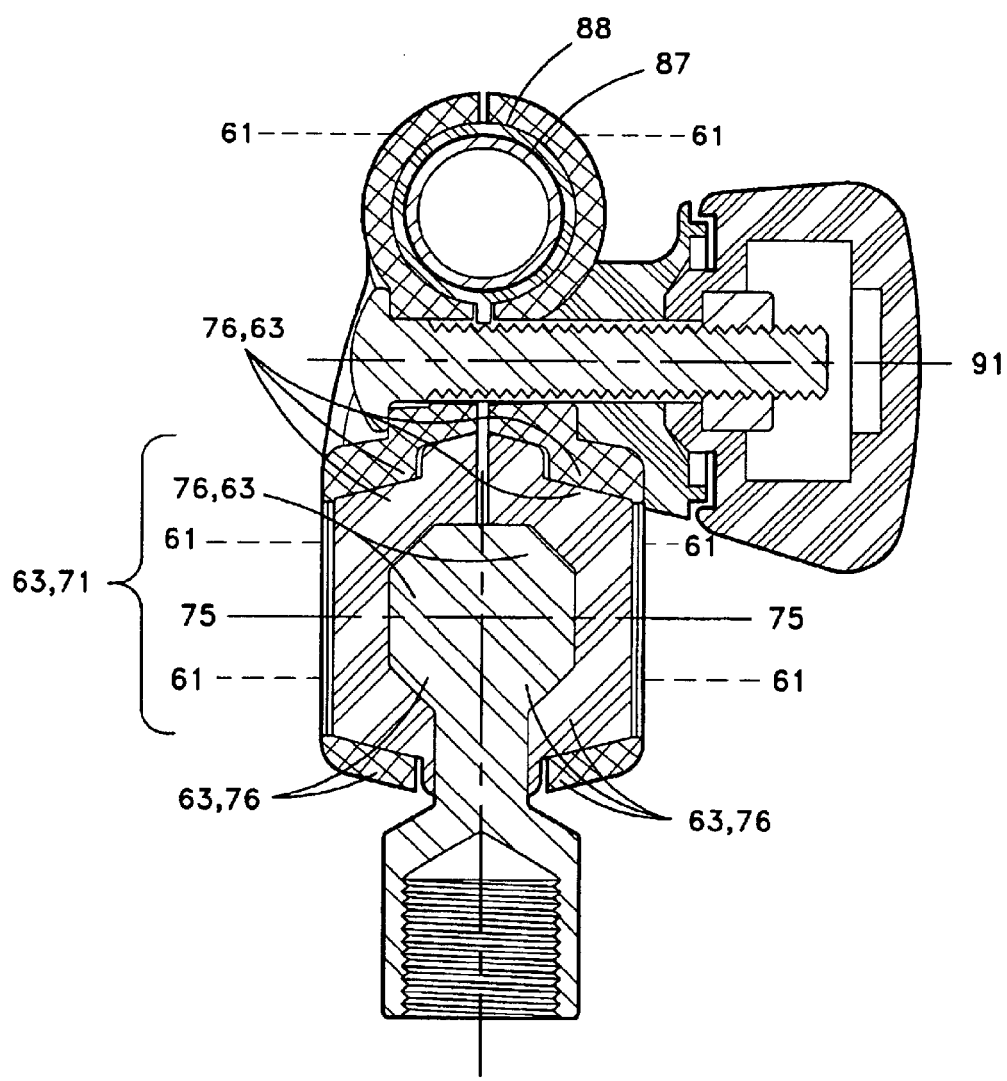

FIG. 6 shows a microphone support boom movement control apparatus and a microphone support boom as viewed along a retained boom axis in cross-section view.

Figure 7:
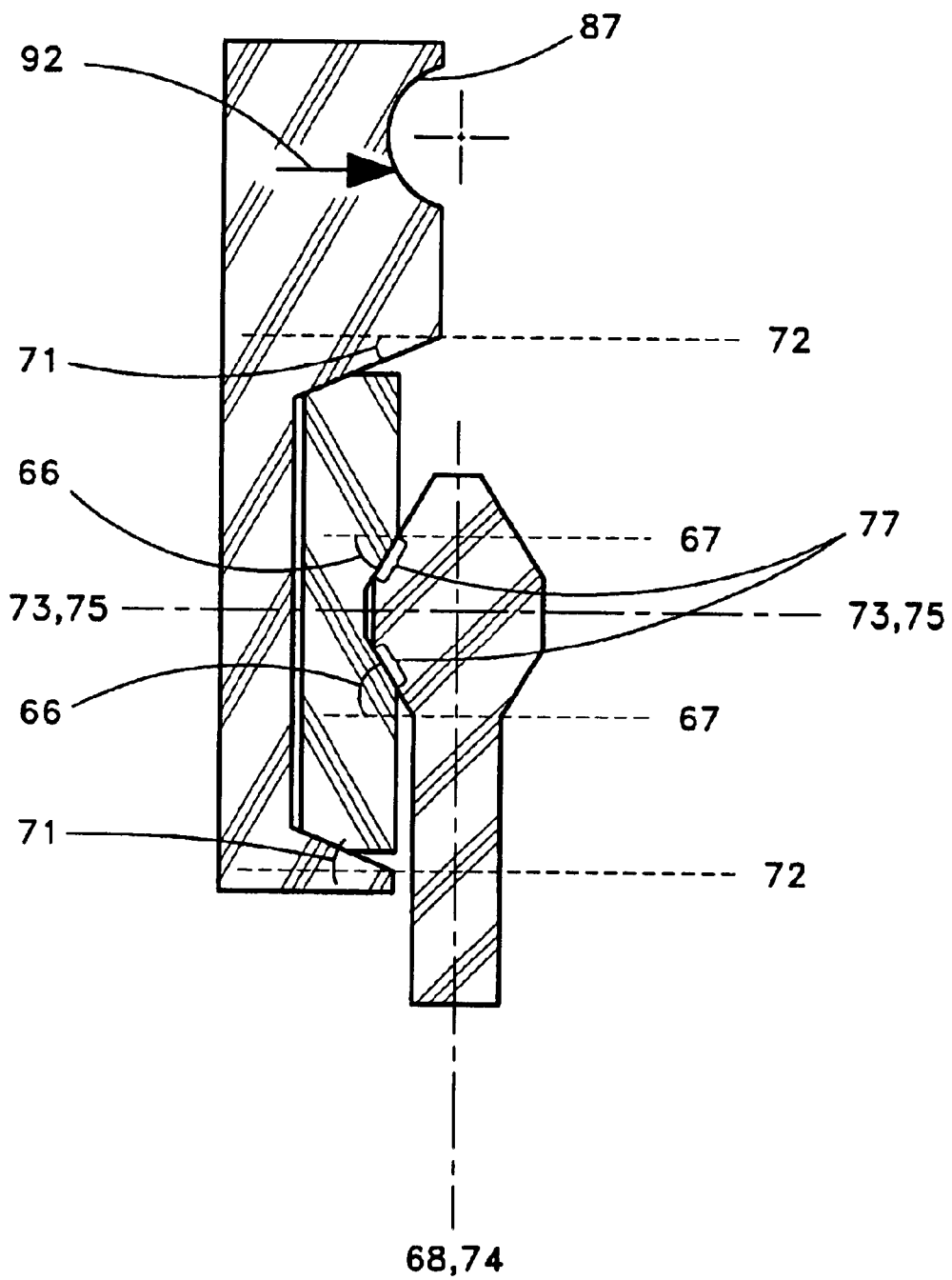

FIG. 7 shows a cross-sectional view of functional parts of a double conical clutch that provides for preferential yaw release and deferential pitch release.

Figure 8:
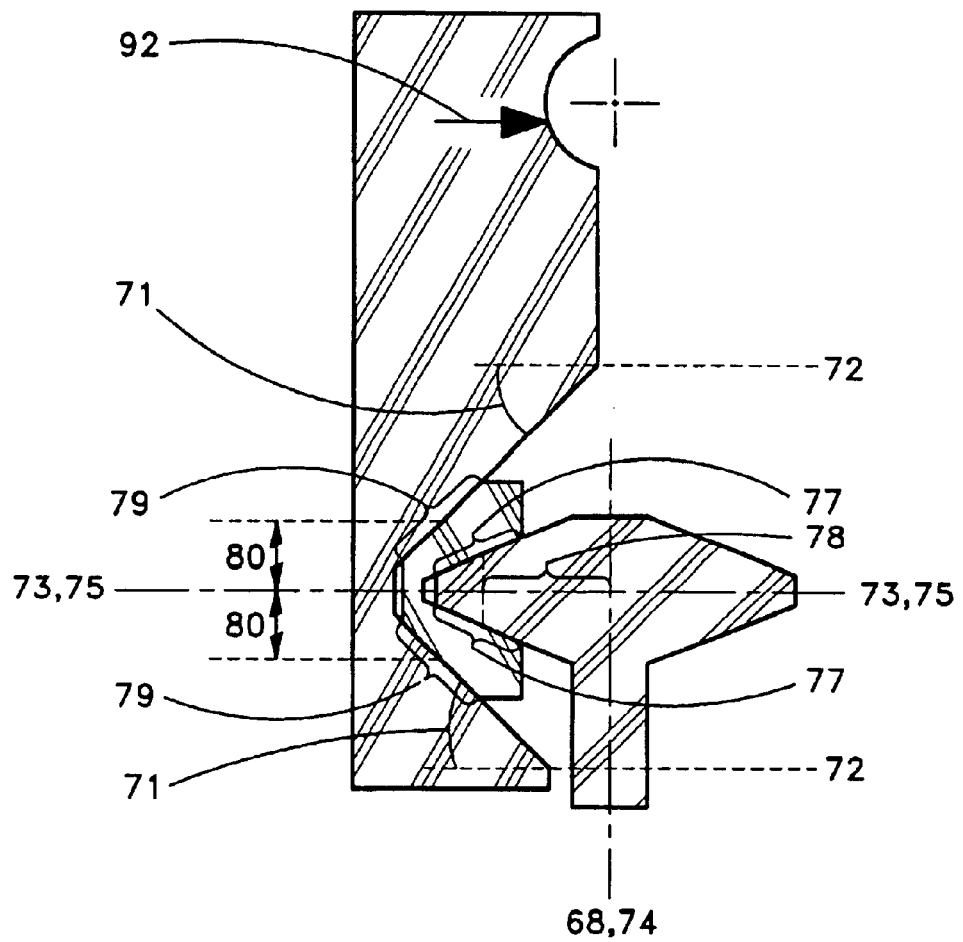

FIG. 8 shows a cross-sectional view of functional parts of a double conical clutch that provides for preferential pitch release and deferential yaw release.

Figure 9:
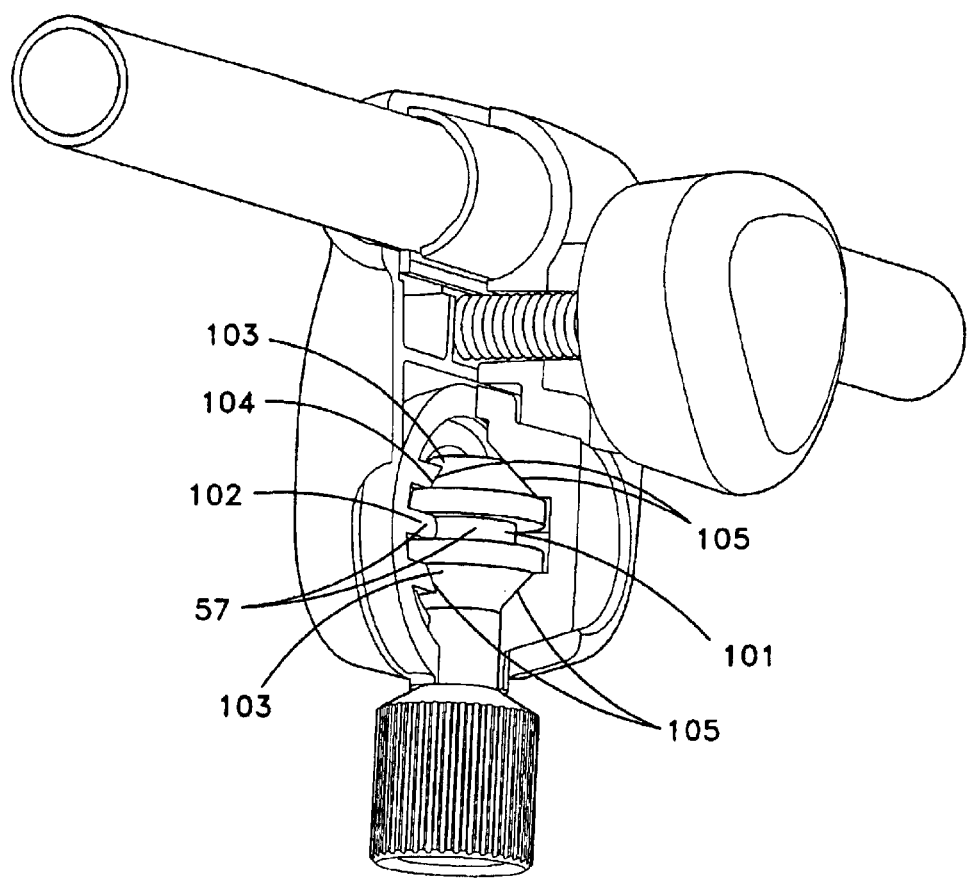
Figure 10:
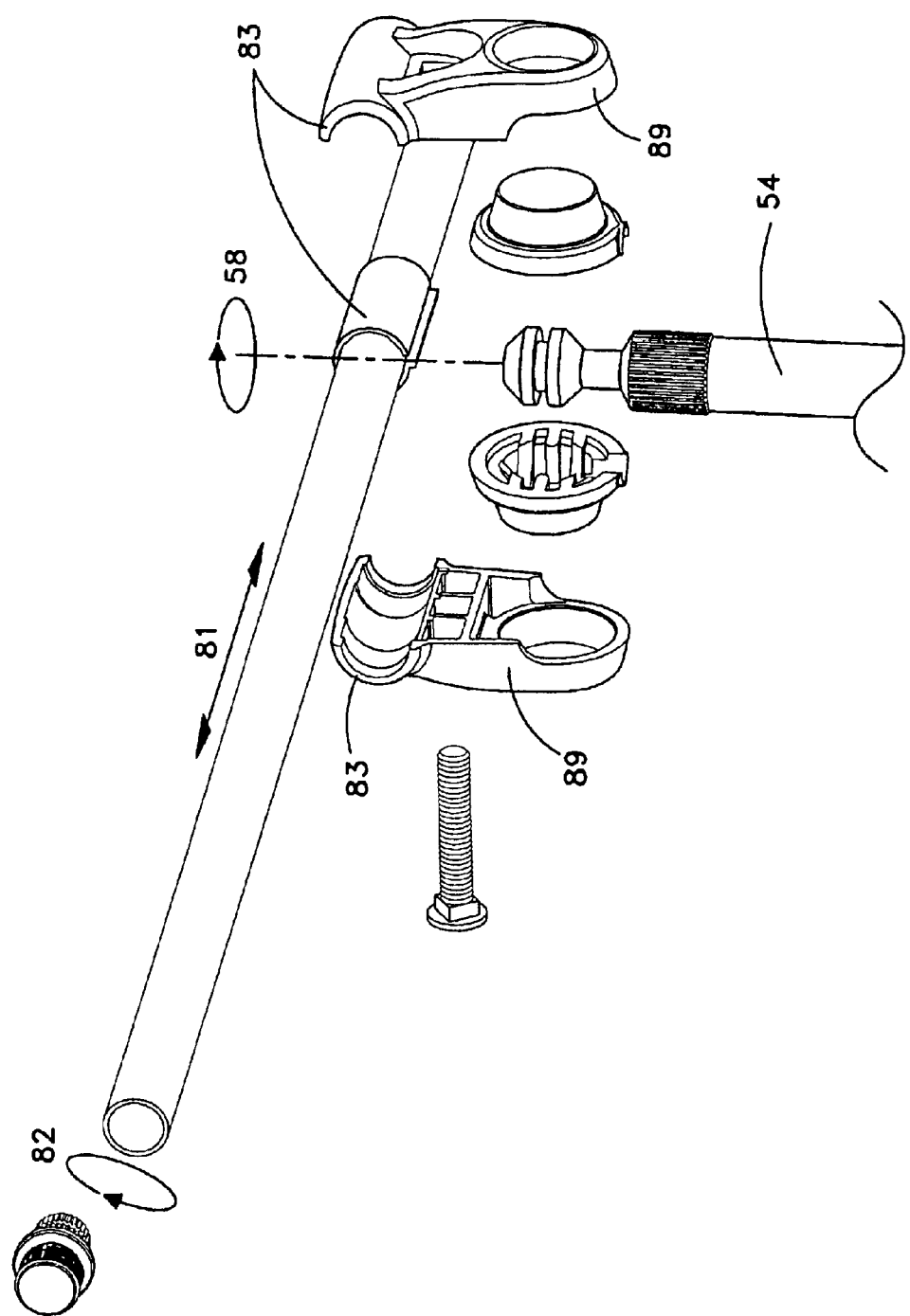

FIG. 9 shows a perspective cut-away view of a microphone support boom movement control apparatus, and a microphone support boom FIG. 10 shows an exploded perspective view of certain parts of a microphone support boom movement control apparatus, and a microphone support boom.

Figure 11:
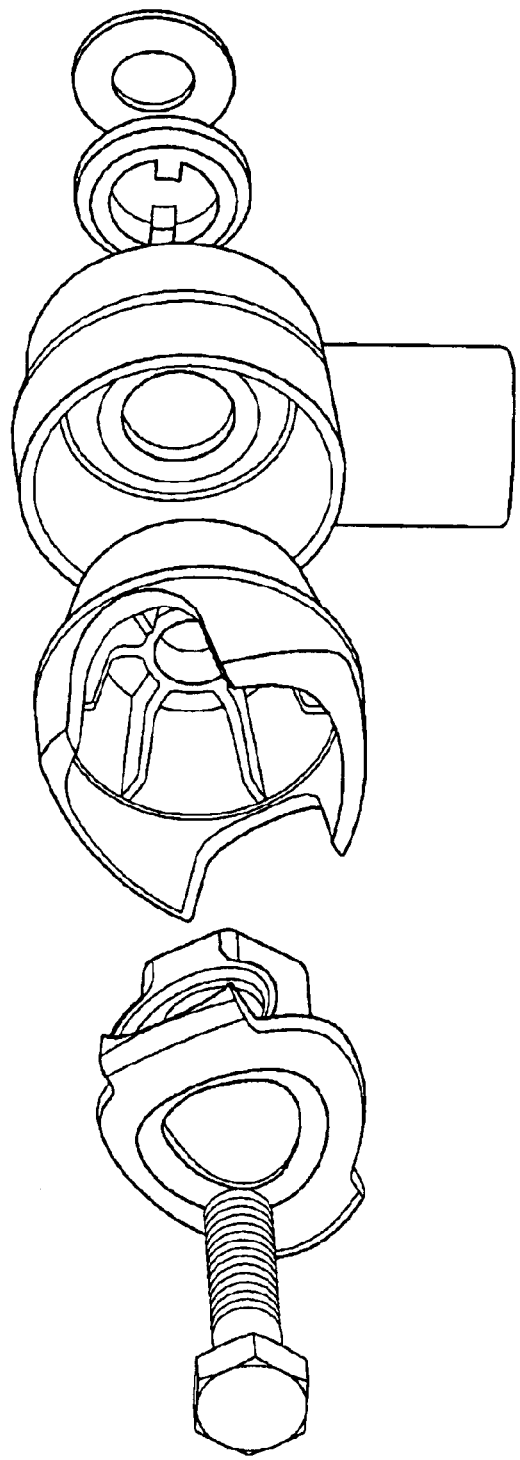

FIG. 11 shows an exploded perspective view of merely an example of a rotational motion control apparatus.

Figure 12:
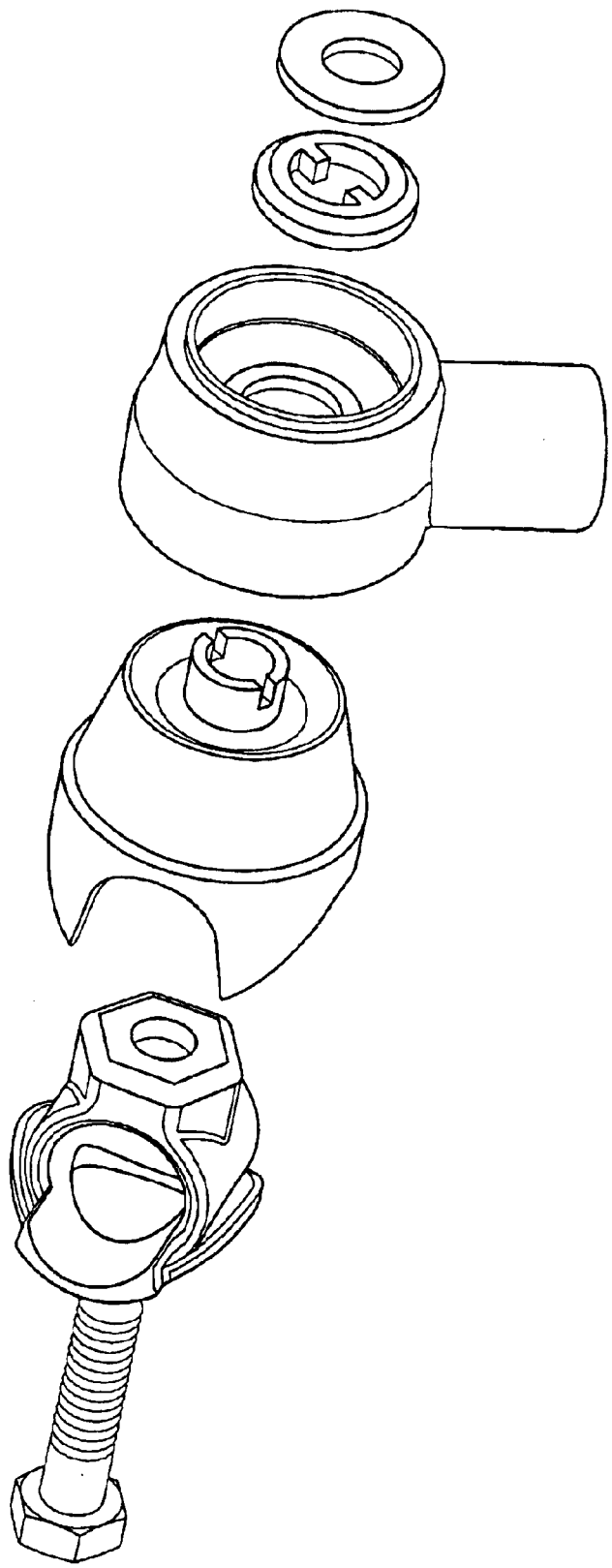

FIG. 12 shows an exploded perspective view of merely an example of a rotational motion control apparatus.

Figure 13:
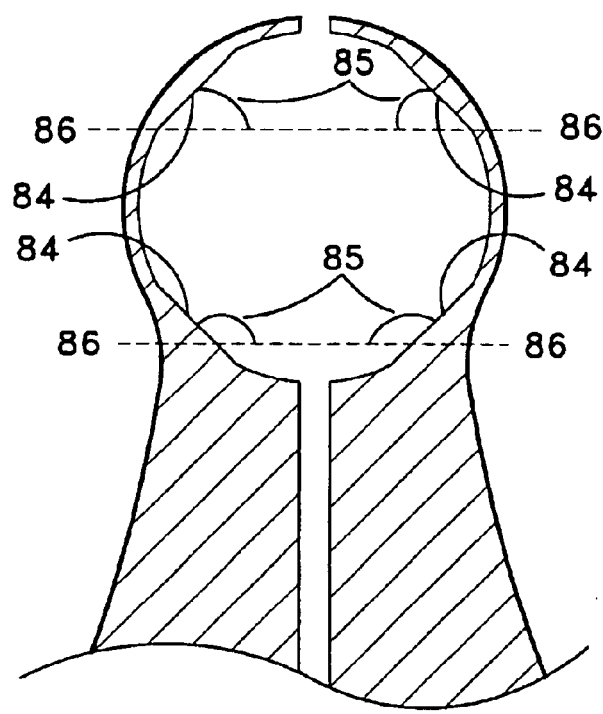

FIG. 13 shows a cross-sectional view of a microphone support boom retention element.

Figure 14:
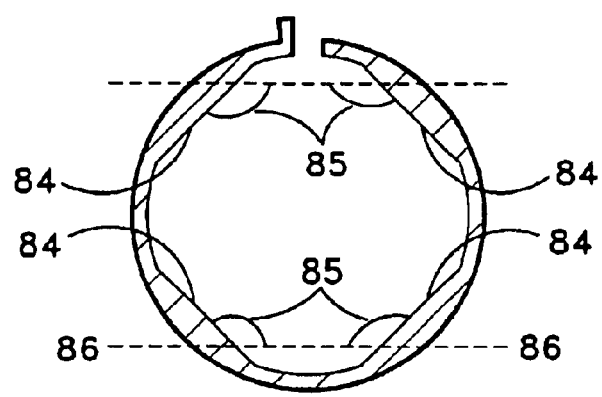

FIG. 14 shows a cross-sectional view of a sleeved that may form part of a microphone support boom retention element.

DETAILED DESCRIPTION OF THE PREFERRED EMBODIMENTS

In at least one embodiment, the invention is a microphone support boom movement, or motion control apparatus (50) that may comprise a microphone support boom multiple degree of freedom motion control element (51) that is adapted to control motion of a microphone support boom (52) in at least two degrees of freedom, an attachment element (53) that may be configured to attach the microphone support boom multiple degree of freedom motion control element to a microphone stand (54) upon engagement of the attachment element with the microphone stand, an activatable, microphone support boom yaw isolation element (55) that is operable to isolate yaw of the microphone support boom about a microphone support boom yaw axis (74) from the attachment element when the attachment element is in the fully engaged configuration; and a microphone support boom retention element (56) to which the microphone support boom is responsive. Note that the microphone support boom need not be lengthy, and indeed may be as small or smaller than the microphone itself, in some less typical applications. The term microphone stand as used herein is used to refer to that part of the entire microphone support assembly that contacts the floor (or is attached to a base that contacts the floor) and may have a part or parts that provide vertical extension capability. The term attach, as used herein, should not be construed to imply permanence—indeed, one structure that is attached to another may be removably attached. Additionally, unless specifically mentioned as an element that the microphone support boom movement control apparatus comprises, the microphone stand, although referenced in the claims in some other manner, is not an element of the claim.

The attachment element may be immobile relative to the microphone stand when the attachment element is fully engaged with the microphone stand. The microphone support boom multiple degree of freedom motion control element is an assembly usable to control motion in more than one degree of freedom of a microphone support boom relative to a microphone stand to which it may somehow be attached. A degree of freedom of the microphone support boom refers to one of the number of ways in which the microphone support boom may move, wherein that motion is somehow characterizable (e.g., as yaw of the microphone support boom), even if that motion is in combination with that another or other degree of freedom motions (e.g., yaw combined with pitch, and axial slide of the microphone support boom). The attachment element may be usable to attach in some manner (as by threads or a clamp or a bolt, as but three examples) the microphone support boom multiple degree of freedom motion control element to a microphone stand upon some type of engagement of the attachment element (whether by threading, clamping, or bolting, as but three examples) with the microphone stand. The term "configured to", or "adapted to" refer to sizing, designing, and/or shaping to accomplish the indicated function or conform as characterized.

The activatable, microphone support boom yaw isolation element is a part or assembly (that may or may not include magnetic elements) that is usable, upon activation, to isolate yaw of the microphone support boom from the attachment element when the attachment element is fully engaged with the microphone stand (e.g., fully tightened or clamped, as but two examples). In this manner, yaw of the microphone support boom may take place independently of the attachment element (and also of the microphone stand), and thus, yaw of the microphone support boom will not result in any rotation of the attachment element. In at least one embodiment, the activatable, microphone support boom yaw isolation element is located or situated above the attachment element when the apparatus is in an installed configuration (as when the microphone support assembly is assembled and atop a surface). Yaw, although a term commonly used in an aeronautics or nautical context, is entirely appropriate in the instant application, in that the term may generally refer to angular motion about a vertical axis (this vertical axis may be a line from the center of the base of the microphone stand where it may contact the floor to a center of the attachment element). However, given that certain potential applications of the inventive apparatus may involve a microphone or other stand that is not established vertically, in its most general usage, the term yaw means angular rotation about a longitudinal axis defined by the microphone or other stand to which the microphone support boom multiple degree of freedom motion control element may be attached by way of the attachment element. Of course, this axis may be vertical or off-vertical. The term pitch as used in the application may refer to angular motion about a horizontal, lateral axis of the microphone support boom (i.e., one that is horizontal and that is orthogonal to a vertical projection of the microphone support boom in an installed configuration atop a microphone stand). Other degrees of freedom may be termed microphone support boom axial degree of freedoms and may include microphone support boom axial translation (81) (which refers to translation of the microphone support boom along its longitudinal axis) and microphone support boom axial rotation (82) (which refers to angular motion of the microphone support boom about its longitudinal axis). The microphone support boom retention element is any part or assembly that is operable to retain the microphone support boom as by holding it secure against motion in at least one degree of freedom. Thus, the microphone support boom may be responsive to the microphone support boom retention element. Further, in at least one embodiment of the invention, the activatable, microphone support boom yaw isolation element may comprise a double opposing conical element (e.g., a first double opposing conical element (94)) and a shell (e.g., a first shell (95)) having an inner surface (e.g., a first inner surface (96)) adapted to interface the double opposing conical element.

In at least one embodiment, the microphone support boom multiple degree of freedom motion control element may include a microphone support boom yaw guide element (57) to which a microphone support boom is directionally responsive. This guide element may be any element that is particularly configured to enable and guide yaw of the microphone support boom. Additionally, in at least one embodiment, the microphone support boom multiple degree of freedom motion control element may comprise the activatable, microphone support boom yaw isolation element. Further, the activatable, microphone support boom yaw isolation element may comprise the microphone support boom yaw guide element. Indeed, recitation in any claim of an element separately from recitation of another element is not to be construed as a limitation of the elements as discretized instrumentalities or components, as there indeed may be overlap of one element with another separately recited element, or two separately recited elements may be the same part or assembly, or one element may form a part of, or instead comprise another separately recited element.

In at least one embodiment, the microphone support boom multiple degree of freedom motion control element may be adapted to control at least yaw (58) and pitch (59) of a microphone support boom. In at least one embodiment, the microphone support boom multiple degree of freedom motion control element may be also adapted to control microphone support boom axial translation and/or microphone support boom axial rotation. The activatable, microphone support boom yaw isolation element may include an adjustable compression application element (60) (such as a threaded bolt and a matingly threaded hole or nut) that is operable to apply and disapply a compressive force. This compressive force may act along a compressive force axis (61); its application (perhaps when the adjustable compression application element is turned clockwise, e.g., in the case where it is a bolt and nut) may result in deactivation of the activatable, microphone support boom yaw isolation element (e.g., a termination of isolation of yaw) and its disapplication may result in activation (e.g., an initiation of isolation of yaw) of the activatable, microphone support boom yaw isolation element.

Further, in at least one embodiment of the invention, the microphone support boom multiple degree of freedom motion control element may be adjustable from a complete microphone support boom retention setting to an incomplete microphone support boom retention setting. The complete microphone support boom retention setting is that setting which prevents all motion of the microphone support boom relative to the attachment element and/or the microphone stand. In the complete microphone support boom retention setting, there is no isolation of any type of motion of the microphone support boom from the attachment element and/or the microphone stand. In the incomplete microphone support boom retention setting there is at least microphone support boom yaw isolation. Indeed, the activatable, microphone support boom yaw isolation element may be operable to isolate yaw of the microphone support boom from the attachment element when the attachment element is in the fully engaged configuration and when the microphone support boom multiple degree of freedom motion control element is in an incomplete microphone support boom retention setting.

In at least one embodiment of the invention, the adjustable compression application element may enable adjustment of the microphone support boom multiple degree of freedom motion control element from a complete microphone support boom retention setting (e.g., where motion of the microphone support boom relative to the attachment element or the microphone stand under a design application of force is precluded) to an incomplete microphone support boom retention setting (where motion in at least one microphone support degree of freedom relative to the attachment element of the microphone stand under a design application of force is allowed).

The microphone support boom movement control apparatus may further comprise a preferential, microphone support boom yaw isolation element (62) that is adapted to allow yaw of the microphone support boom before allowing other motion of the microphone support boom (such as motion in any other of the previously mentioned microphone support boom degrees of freedom). This preferential isolation of yaw may be provided upon activation of the activatable, microphone support boom yaw isolation element and when the attachment element is fully engaged. In at least one embodiment, the preferential, microphone support boom yaw isolation element may comprise a double conical yaw clutch (63) which may itself have frictive yaw surfaces (64), at least one of which may be frustum-shaped, and frictive pitch surfaces (69), at least one of which may be frustum-shaped. The frustum-shaped frictive yaw surface (65) may have a frictive yaw surface angle (66) relative to a frictive pitch surface proximate compressive force axis (67) (an axis of application of a compressive force that is near the relevant frictive yaw surface and that, in a preferred embodiment, is horizontal), and may have a frictive yaw surface axis (68) (an axis somehow defined by the frictive yaw surface) that is collinear with the microphone support boom yaw axis (74) (i.e., the axis about which yaw may occur—vertical or off-vertical). The frustum-shaped frictive pitch surface (70) may have a frictive pitch surface angle (71) relative to a frictive pitch surface proximate compressive force axis (72) (an axis of application of a compressive force that is near the relevant frictive pitch surface and that, in a preferred embodiment, is horizontal when the support boom movement control apparatus is installed), and may have a frictive pitch surface axis (73) that is collinear with a microphone support boom pitch axis (75) (i.e., the axis about which pitch may occur). Generally, the double conical yaw clutch may be any device that includes these elements.

In at least one embodiment, the frictive yaw surface angle is greater than the frictive pitch surface angle so that the normal force acting on the yaw rotatable, frictive yaw surface (that frictive yaw surface that is rotatable about a yaw axis), and thus also the frictional force acting on this surface, is less than that normal force, and, respectively, that associated frictional force, acting on the pitch rotatable, frictive pitch surface (that frictive pitch surface that is rotatable about a pitch axis). Of course, these rotatable frictive surfaces are those frictive surfaces that rotate when the referenced motion (e.g., yaw or pitch) is occurring. It is this difference in the angles of the frictive surfaces that is one manner of achieving differential, or more particularly, preferential isolation or release of microphone support boom yaw. Indeed, it may be used to achieve preferential isolation for a degree of freedom motion relative to other degrees of freedom. When one set of contacting frictive surfaces is established internally of another other, and the angles are manipulated in such a manner as to afford preferential isolation of motion in one degree of freedom relative to motion in another, the double conical yaw clutch may be referred to a nested double conical clutch (76), or more generally, a nested conical clutch. When the preferentially isolated degree of freedom is yaw, then the double conical clutch may be referred to as a double conical yaw clutch, and the nested double conical clutch may be referred to as a nested double conical yaw clutch.

In at least one embodiment of the invention, the preferential, microphone support boom yaw isolation element may comprise frictive yaw surfaces that exhibit a yaw surface coefficient of static friction, and frictive pitch surfaces that exhibit a pitch surface coefficient of static friction. These coefficient of static friction values may be manipulated to afford a differential or preferential isolation or release of yaw relative to pitch. This preferential isolation would result when the yaw surface coefficient of static friction is less than the pitch surface coefficient of static friction. Manipulation of the relevant coefficients of static friction may be used alone, or in conjunction with one or more other manners or achieving preferential microphone support boom yaw isolation.

In at least one embodiment, the preferential, microphone support boom yaw isolation element may comprise a yaw rotatable frictive yaw surface (77) having an effective yaw surface moment arm (78) relative to the microphone support boom yaw axis; and a pitch rotatable frictive pitch surface (79) having an effective pitch surface moment arm (80) relative to the microphone support boom pitch axis; the preferential isolation of yaw may be achieved upon designing and manufacturing the apparatus so that the effective yaw surface moment arm is smaller than the effective pitch surface moment arm. Elementary statics will show that even where a frictional force acting on a yaw rotatable, frictive yaw surface is equal to a frictional force acting on a pitch rotatable, frictive pitch surface, if the point of application of the frictional force acting on the yaw rotatable, frictive yaw surface is a distance from the associated axis of rotation (here, the yaw axis) that is less than the distance from that point of application of the frictional force on the pitch rotatable, frictive pitch surface to the pitch axis, then preferential yaw isolation may be achieved.

It is important to understand that merely adjusting certain relevant design parameters and/or dimensions mentioned above in order to achieve a desired preferential isolation of motion in a certain degree of freedom might not result in the desired preferential isolation in every microphone support application. As an illustration, consider the extreme case where an inordinately heavy microphone is placed at the end of the microphone support boom and the opposite end of the boom is attached to the microphone support boom motion control apparatus. Of course, such a setup would result in an inordinate pitch moment or torque (arising from the weight of the microphone and the support boom on the microphone side and the moment arm at which that combined weight effectively acts) that might "override" any design attempts to create preferential yaw isolation because upon an initial release of the compression that may keep the entire setup intact (by preventing relative motion of structural parts), the pitch might occur (without any application of force by, e.g., a nearby user of the microphone support assembly) before the movement control apparatus is sufficiently loosened to allow conveniently induced yaw motion. By conveniently induced yaw motion is meant the manner of inducing yaw motion intended by the design—simply pushing the microphone or the microphone support boom using a lateral force, without having to grasp the microphone stand, without causing movement of the base of the microphone stand relative to the floor it contacts, and without inducing tilt in the microphone stand axis. Thus, the different manners of achieving preferential release disclosed herein may not result in the intended preferential or differential release in all conceivable configurations.

In at least one embodiment, the microphone support boom multiple degree of freedom motion control element may be adapted to control motion of the microphone support boom also in at least one microphone support boom axial degree of freedom, whether that motion be microphone support boom axial translation and/or microphone support boom axial rotation. The microphone support boom movement control apparatus may further comprise a non-preferential microphone support boom axial degree of freedom motion isolation element (83) that is adapted to isolate motion in at least one microphone support boom axial degree of freedom from the microphone stand after a start of the preferential isolation of yaw. Of course, such isolation of motion occurs when the microphone support boom axial translation and/or microphone support boom axial rotation can occur independently of motion of the microphone stand, so that, e.g., support boom axial translation does not result in any motion of the microphone stand. It is important to understand that any microphone support boom multiple degree of freedom motion control element may comprise a preferential, microphone support boom yaw isolation element and/or a non-preferential microphone support boom axial degree of freedom motion isolation element.

In at least one embodiment, the non-preferential microphone support boom axial degree of freedom isolation element may comprise at least four frictive microphone support boom axial motion surfaces (84), at least two of which may have a microphone support boom axial degree of freedom motion frictive angle (85) relative to a boom axial motion frictive surface proximate compressive force axis (86) (an axis of application of a compressive force that is near the relevant frictive microphone support boom axial motion surface and that, in a preferred embodiment, is horizontal) and that is less than a frictive yaw surface angle. In this manner, the friction force acting on the microphone support boom may be greater than that friction force acting on the yaw rotatable, frictive yaw surface and a non-preferential isolation of either or both of two microphone support boom axial degree of freedom motions may result. In at least one embodiment, the microphone support boom axial degree of freedom motion frictive angle may be less than the frictive pitch angle so as to achieve non-preferential isolation of any of the microphone support boom axial degree of freedom motions relative to pitch isolation.

It is important to understand that when indication is made that an angle is measured relative to a compressive force axis, this angle is measured relative the axis along which the externally applied force attempts to move internal parts when the microphone support boom movement apparatus is in an installed configuration (in most applications, this axis will be horizontal). Thus, the horizontal component of any normal force that acts on internal surfaces (whether they be vertical or off-vertical) is deemed the compressive force axis. Further, the angle is to be measured between lines (one parallel with the relevant surface and the other parallel with the compression axis) that each (a) lie within a plane that contains the longitudinal axis of the relevant cone (if the relevant surface is part of a conical clutch), or (b) lie within a plane that is orthogonal to the longitudinal axis of any cylinder or tubular structure (as might be found in the case of a microphone support boom and the frictive microphone support boom axial motion surfaces that may be angled so as to non-preferentially isolate axial motion of a comprehensively retained microphone support boom).

In at least one embodiment, the non-preferential microphone support boom axial degree of freedom motion isolation element may comprise at least one frictive microphone support boom axial degree of freedom surface (87) that exhibits a microphone support boom axial degree of freedom surface coefficient of static friction when this surface is in static contact with an external surface (88) of the microphone support boom. In order to achieve non-preferential isolation either of two microphone support boom axial degree of freedom motions relative to yaw, the microphone support boom axial degree of freedom surface coefficient of static friction may be greater than the yaw surface coefficient of static friction. Further, in order to achieve non-preferential isolation either of two microphone support boom axial degree of freedom motions relative to pitch, the microphone support boom axial degree of freedom surface coefficient of static friction may be greater than the yaw surface coefficient of static friction.

In at least one embodiment, the non-preferential microphone support boom axial degree of freedom motion isolation element may comprise a clamp (89) configured so that a microphone support boom pitch axis is a first distance (90) from an external compression application axis (91), an effective point of application (92) of a microphone support boom frictional force (e.g., that frictional force that acts directly on the microphone support boom to prevent axial degree of freedom motion of the boom) is a second distance (93) from the external compression application axis, and the first distance is greater than the second distance. The external compression axis may be that axis that is collinear with the externally applied compressive force, and may be collinear with any screw or bolt that is part of the adjustable compression application element. The effective point of application of the microphone support boom frictional force is generally located at a point between the edge of the microphone support boom frictional force application that is nearest from the external compression axis to the edge of the microphone support boom frictional force application that is furthest from the external compression axis. In this manner, the frictional force acting on the microphone support boom may be greater than the frictional force acting on the pitch rotatable frictive pitch surface. Such manipulation of frictional force may result in non-preferential isolation of any of the axial motions of the microphone support boom relative to pitch of the microphone support boom.

In at least one embodiment of the invention, the microphone support boom multiple degree of freedom motion control element may be adapted to control microphone support boom yaw and microphone support boom pitch. In at least one other, it may be adapted to also control microphone support boom axial translation or axial rotation; in still others it may be adapted to control four degrees of freedom of the microphone support boom—microphone support boom yaw, microphone support boom pitch, microphone support boom axial translation, and microphone support boom axial rotation. At least one embodiment of the invention may comprise a microphone support boom multiple degree of freedom motion control element adapted to control motion of the microphone support boom in four degrees of freedom.

At least one embodiment of the invention does not comprise a jamb nut in order to isolate yaw of the microphone support boom about a microphone support boom yaw axis from the attachment element when the attachment element is in the fully engaged configuration.

In at least one embodiment of the invention, the microphone support boom movement control apparatus may further comprise a microphone support boom pitch isolation element (97) that itself may comprise a double opposing conical element (e.g.. a second double opposing conical element (98)) and a shell (e.g.. a second shell (99)) having an inner surface (e.g.. a second inner surface (100)) adapted to interface the double opposing conical element. Upon release of a compressive force (as an externally applied compressive force) applied to the double opposing conical element and shell, pitch of the microphone boom element may be isolated from the microphone stand and/or the attachment element. In at least one embodiment of the invention, the microphone support boom yaw guide element may comprise a double opposing conical element (103) and an shell (104) having an inner surface (105) adapted to interface the double opposing conical element. Additionally, at least one embodiment of the invention may comprise a substantially circular recessive channel (101) and a substantially ring-shaped key (102), at least part of which is configured to fit in the substantially circular recessive channel. Generally, any part(s) that is particularly configured to allow for yaw and to direct a related rotation about a yaw axis may be referred to as a microphone support boom yaw guide element.

A method of using or usage of the microphone support boom movement control apparatus (a microphone support boom movement control usage method) is also an aspect of the inventive subject matter and may comprise the steps of activating (as by rotating a threaded bolt, as but one example) an activatable, microphone support boom yaw isolation element so as to isolate yaw of a rotatable attachment element from a microphone stand, and rotatably attaching to full engagement the rotatable attachment element to the microphone stand without rotating a microphone support boom multiple degree of freedom motion control element, wherein the activatable, microphone support boom yaw isolation element may form part of a microphone support boom multiple degree of freedom motion control element that is adapted to control motion of a microphone support boom in at least three degrees of freedom. The usage method may further comprise the step of compressively retaining a microphone support boom in a microphone support boom retention element that forms a part of the microphone support boom multiple degree of freedom motion control element. The usage method may also comprise the steps of adjusting (as by rotation, e.g.) an adjustable compression application element so as to enable yaw of the retained microphone support boom upon application of a manual lateral force to the retained microphone support boom without pitch of the retained microphone support boom (i.e., application of the manual lateral force to cause yaw of the retained microphone support boom does not cause pitch of the retained microphone support boom); and applying the manual lateral force to the retained microphone support boom (or course this can be done by contacting the boom directly or contacting the microphone that is carried by or attached to it) to cause microphone support boom yaw without causing microphone support boom pitch. In at least one embodiment, the usage method may comprise the steps of further adjusting the adjustable compression application element so as to enable yaw of the retained microphone support boom upon application of a manual lateral force to the retained microphone support boom without microphone support boom axial degree of freedom motion of the retained microphone support boom (e.g., microphone support boom axial translation or microphone support boom axial rotation), and applying this manual lateral force to the retained microphone support boom to cause microphone support boom yaw without causing microphone support boom axial degree of freedom motion. The usage method may comprise the steps of further adjusting the adjustable compression application element so as to enable pitch of the retained microphone support boom upon application of a manual vertical force to the retained microphone support boom without microphone support boom axial degree of freedom motion of the retained microphone support boom; and applying the manual vertical force to the retained microphone support boom to cause microphone support boom pitch without causing microphone support boom axial degree of freedom motion. In at least one embodiment, the activatable, microphone support boom yaw isolation element may form a part of a microphone support boom multiple degree of freedom motion control element that is adapted to control motion of a microphone support boom in four degrees of freedom. These four degrees of freedom may comprise microphone support boom yaw, microphone support boom pitch, microphone support boom axial translation, and microphone support boom axial rotation.

An independent aspect of the invention is a double conical clutch that is usable as a preferential, microphone support boom degree of freedom motion isolation element. The double conical clutch may allow motion in a preferred degree of freedom (such as yaw, as but one example) of the microphone support boom before allowing motion of the microphone support boom in any other degree of freedom (deferential degree of freedom motion, or deferential motion). In a microphone support boom movement (or motion) control application, the double conical clutch may comprise frictive preferential motion surfaces, at least one of which is frustum-shaped, this frustum-shaped frictive preferential motion surface having a frictive preferential motion surface angle relative to a frictive preferential motion surface proximate compressive force axis, and having a frictive preferential motion surface axis that is collinear with a microphone support boom preferential motion axis, and frictive deferential motion surfaces, at least one of which is frustum-shaped, the frustum-shaped frictive deferential motion surface having a frictive deferential motion surface angle relative to a frictive deferential motion surface proximate compressive force axis, and having a frictive deferential motion surface axis that is collinear with a microphone support deferential motion axis, wherein the frictive preferential motion surface angle is greater than the frictive deferential motion surface angle, wherein the double conical clutch allows motion in a preferred degree of freedom of the microphone support boom before allowing motion of the microphone support boom in other degrees of freedom, and wherein the double conical clutch isolates the motion in a preferred degree of freedom from the microphone stand. In at least one embodiment, the double conical clutch is a nested, double conical clutch. Of course, above terms that use include either "preferential motion" or "deferential motion" have definitions that are analogous (but broader) to definitions of those terms that are identical but for their use of the terms "preferential motion" or "deferential motion". For example, the frictive preferential motion surface angle has an analogous but broader definition that that provided for that of a frictive yaw surface angle in that the frictive preferential motion surface angle is not limited to yaw but instead, limited to the broader "preferential motion", whichever that may be.

Any of the above-described embodiments, and any additional embodiments disclosed in the drawings are intended to enable control of not only a microphone support boom, but also other structures, including but not limited to a structural support (such as a boom) for other music related devices, a structural support for a measuring instruments and or sensing apparatus, and a structural support for lights, or other structures of which spatial reposition may be desired or advantageous. Essentially elimination of microphone related terms as they may exist in the claims and, possibly, replacement with a term related to an application other than microphone support booms would result in claims that define a scope of coverage that the applicant may later pursue.

In FIG. 1, specific indicated parts are described as follows:

Item No Description
1 Boom Swivel Post
2 Boom Swivel Shoe
3 Boom Swivel Clamp
4 Bolt, Custom Carriage 5/16–18×1.75, Black Zn
5 Boom Guide Sleeve
6 Boom Cord Guide
7 Hex Nut, steel 5/16–18, Zn
8 Boom Swivel Knob Body
9 Boom Swivel Knob Jacket
10 Boom Tube
11 Clutch, Telescoping Boom
12 Tube, Telescoping
13 Nut, 10–25 Square
14 Bolt, 10–24 Custom Knurled
15 Overmold, Thermoplastic Elastomar
16 Boom End Grip
17 Glide, Boom
18 Adapter, Microphone Crimp Further, it should be noted that part 12 (particularly its ends, perhaps) may be crimped after assembly.

As can be easily understood from the foregoing, the basic concepts of the present invention may be embodied in a variety of ways. It involves both structural retention and motion isolation techniques as well as devices to accomplish the appropriate structural retention and motion isolation. In this application, the structural retention and motion isolation techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims are included for the device described, but also method or process claims are included to address the functions the invention and each element performs. Neither the description nor the terminology is intended to limit the scope of the claims in this patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure. They may be relied upon for support of the claims in this patent application. This patent application is designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "attachment element" should be understood to encompass disclosure of the act of "attaching"—whether explicitly discussed or not—and, conversely, were there effectively disclosure of the act of "attaching", such a disclosure should be understood to encompass disclosure of an "attachment element" and even a "means for attaching" Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information disclosure statement or citation filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the retention devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented. In this regard it should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept.

In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A microphone support boom movement control apparatus comprising a microphone support boom multiple degree of freedom motion control element adapted to control microphone support boom yaw, microphone support boom pitch, microphone support boom axial translation, and microphone support boom axial rotation;

an attachment element configured to attach said microphone support boom multiple degree of freedom motion control element to a microphone stand upon engagement of said attachment element with said microphone stand, wherein said attachment element is immobile relative to said microphone stand when said attachment element is fully engaged with said microphone stand, an activatable, microphone support boom yaw isolation element that is operable to isolate yaw of a microphone support boom about a microphone support boom yaw axis from said attachment element when said attachment element is in said fully engaged configuration; and a microphone support boom retention element to which said microphone support boom is responsive, wherein said microphone support boom multiple degree of freedom motion control element includes a microphone support boom yaw guide element to which a microphone support boom is directionally responsive, wherein said activatable, microphone support boom yaw isolation element includes an adjustable compression application element that is operable to apply and disapply a compressive force acting along a compressive force axis, so as to deactivate and activate said activatable, microphone support boom yaw isolation element, respectively, wherein said adjustable compression application element enables adjustment of said microphone support boom multiple degree of freedom motion control element from a complete microphone support boom retention setting to an incomplete microphone support boom retention setting, wherein said microphone support boom movement control apparatus further comprises a preferential, microphone support boom yaw isolation element that is adapted for a preferential isolation of yaw in which yaw of said microphone support boom is allowed before other motion of said microphone support boom is allowed, said preferential isolation of yaw provided upon activation of said activatable, microphone support boom yaw isolation element and when said attachment element is fully engaged.

2. A microphone support boom movement control apparatus as described in claim 1, wherein said preferential, microphone support boom yaw isolation element comprises a double conical yaw clutch having:

(a) frictive yaw surfaces, at least one of which is frustum-shaped, said frustum-shaped frictive yaw surface having a frictive yaw surface angle relative to a frictive yaw surface proximate compressive force axis, and having a frictive yaw surface axis that is collinear with said microphone support boom yaw axis; and (b) frictive pitch surfaces, at least one of which is frustum-shaped, said frustum-shaped frictive pitch surface having a frictive pitch surface angle relative to a frictive pitch surface proximate compressive force axis, and having a frictive pitch surface axis that is collinear with a microphone support boom pitch axis, wherein said frictive yaw surface angle is greater than said frictive pitch surface angle.

3. A microphone support boom movement control apparatus as described in claim 1, wherein said preferential, microphone support boom yaw isolation element comprises:

(a) frictive yaw surfaces that exhibit a yaw surface coefficient of static friction; and (b) frictive pitch surfaces that exhibit a pitch surface coefficient of static friction, wherein said yaw surface coefficient of static friction is less than said pitch surface coefficient of static friction.

4. A microphone support boom movement control apparatus as described in claim 1, wherein said preferential, microphone support boom yaw isolation element comprises:

(a) a yaw rotatable frictive yaw surface having an effective yaw surface moment arm relative to said microphone support boom yaw axis; and (b) pitch rotatable frictive pitch surface having an effective pitch surface moment arm relative to said microphone support boom pitch axis, wherein said effective yaw surface moment arm is smaller than said effective pitch surface moment arm.

5. microphone support boom movement control apparatus as described in claim 2, 3, or 4, wherein said microphone support boom movement control apparatus further comprises a non-preferential microphone support boom axial degree of freedom motion isolation element that is adapted to isolate said microphone support boom axial translation and said microphone support boom axial rotation from said microphone stand after a start of said preferential allowance of yaw.

6. A microphone support boom movement control apparatus as described in claim 5, wherein said non-preferential microphone support boom axial degree of freedom motion isolation element comprises at least four frictive microphone support boom axial motion surfaces, at least two of which have a microphone support boom axial degree of freedom motion frictive angle relative to a boom axial motion frictive surface proximate compressive force axis and that is less than said frictive yaw surface angle.

7. A microphone support boom movement control apparatus as described in claim 5, wherein said non-preferential microphone support boom axial degree of freedom motion isolation element comprises at least one frictive microphone support boom axial degree of freedom surface exhibiting a microphone support boom axial degree of freedom surface coefficient of static friction when in static contact with an external surface of said microphone support boom, wherein said microphone support boom axial degree of freedom surface coefficient of static friction is greater than said yaw surface coefficient of static friction.

8. A microphone support boom movement control apparatus as described in claim 5, wherein said non-preferential microphone support boom axial degree of freedom motion isolation element comprises a clamp configured so that a microphone support boom pitch axis is a first distance from an external compression application axis, an effective point of application of a microphone support boom frictional force is a second distance from said external compression application axis, and said first distance is greater than said second distance.

9. A microphone support boom movement control apparatus as described in claim 5, further comprising said microphone support boom.

10. A microphone support boom movement control apparatus as described in claim 9, further comprising said microphone stand.

11. A microphone support boom movement control apparatus as described in claim 5, wherein said activatable, microphone support boom yaw isolation element comprises a first double opposing conical element and a first shell having a first inner surface adapted to interface said first double opposing conical element.

12. A microphone support boom movement control apparatus as described in claim 11, further comprising a microphone support boom pitch isolation element that comprises a second double opposing conical element and a second shell having a second inner surface adapted to interface said second double opposing conical element.

13. A microphone support boom movement control apparatus comprising:

a microphone support boom multiple degree of freedom motion control element adapted to control motion of a microphone support boom in at least two degrees of freedom;

an attachment element configured to attach said microphone support boom multiple degree of freedom motion control element to a microphone stand upon engagement of said attachment element with said microphone stand, wherein said attachment element is immobile relative to said microphone stand when said attachment element is fully engaged with said microphone stand, an activatable, microphone support boom yaw isolation element that is operable to isolate yaw of said microphone support boom about a microphone support boom yaw axis from said attachment element when said attachment element is in said fully engaged configuration; and a microphone support boom retention element to which said microphone support boom is responsive wherein said microphone support boom multiple degree of freedom motion control element is adapted to control at least yaw and pitch of said microphone support boom, wherein said activatable, microphone support boom yaw isolation element includes an adjustable compression application element that is operable to apply and disapply a compressive force acting along a compressive force axis, so as to deactivate and activate said activatable, microphone support boom yaw isolation element. respectively, and wherein said microphone support boom movement control apparatus further comprises a preferential, microphone support boom yaw isolation element that is adapted for a preferential isolation of yaw in which yaw of said microphone support boom is allowed before other motion of said microphone support boom is allowed, said preferential isolation of yaw provided upon activation of said activatable, microphone support boom yaw isolation element and when said attachment element is fully engaged.

14. A microphone support boom movement control apparatus as described in claim 13, wherein said preferential, microphone support boom yaw isolation element comprises a double conical yaw clutch having:

(a) frictive yaw surfaces, at least one of which is frustum-shaped, said frustum-shaped frictive yaw surface having a frictive yaw surface angle relative to a frictive yaw surface proximate compressive force axis, and having a frictive yaw surface axis that is collinear with said microphone support boom yaw axis; and (b) frictive pitch surfaces, at least one of which is frustum-shaped, said frustum-shaped frictive pitch surface having a frictive pitch surface angle relative to a frictive pitch surface proximate compressive force axis, and having a frictive pitch surface axis that is collinear with a microphone support boom pitch axis, wherein said frictive yaw surface angle is greater than said frictive pitch surface angle.

15. A microphone support boom movement control apparatus as described in claim 14, wherein said double conical yaw clutch comprises a nested, double conical yaw clutch.

16. microphone support boom movement control apparatus as described in claim 13, wherein said preferential, microphone support boom yaw isolation element comprises:

(a) frictive yaw surfaces that exhibit a yaw surface coefficient of static friction; and (b) frictive pitch surfaces that exhibit a pitch surface coefficient of static friction, wherein said yaw surface coefficient of static friction is less than said pitch surface coefficient of static friction.

17. A microphone support boom movement control apparatus as described in claim 13, wherein said preferential, microphone support boom yaw isolation element comprises:

(a) a yaw rotatable frictive yaw surface having an effective yaw surface moment arm relative to said microphone support boom yaw axis; and (b) pitch rotatable frictive pitch surface having an effective pitch surface moment arm relative to said microphone support boom pitch axis, wherein said effective yaw surface moment arm is smaller than said effective pitch surface moment arm.

18. A microphone support boom movement control apparatus as described in claim 13, 14, 15, 16, or 17, wherein said microphone support boom multiple degree of freedom motion control element is adapted to control motion of a microphone support boom also in at least one microphone support boom axial degree of freedom selected from the group of microphone support boom axial degree of freedoms consisting of: microphone support boom axial translation and microphone support boom axial rotation.

19. A microphone support boom movement control apparatus as described in claim 18, wherein said wherein said microphone support boom movement control apparatus further comprises a non-preferential microphone support boom axial degree of freedom motion isolation element that is adapted to isolate said motion in at least one microphone support boom axial degree of freedom from said microphone stand after a start of said preferential allowance of yaw.

20. A microphone support boom movement control apparatus as described in claim 19, wherein said non-preferential microphone support boom axial degree of freedom motion isolation element comprises at least four frictive microphone support boom axial motion surfaces, at least two of which have a microphone support boom axial degree of freedom motion frictive angle relative to a boom axial motion frictive surface proximate compressive force axis and that is less than said frictive yaw surface angle.

21. A microphone support boom movement control apparatus as described in claim 20, wherein said microphone support boom axial degree of freedom motion frictive angle is less than said frictive pitch surface angle.

22. A microphone support boom movement control apparatus as described in claim 19, wherein said non-preferential microphone support boom axial degree of freedom motion isolation element comprises at least one frictive microphone support boom axial degree of freedom surface exhibiting a microphone support boom axial degree of freedom surface coefficient of static friction when in static contact with an external surface of said microphone support boom.

23. A microphone support boom movement control apparatus as described in claim 22, wherein said microphone support boom axial degree of freedom surface coefficient of static friction is greater than said yaw surface coefficient of static friction.

24. A microphone support boom movement control apparatus as described in claim 19, wherein said non-preferential microphone support boom axial degree of freedom motion isolation element comprises a clamp configured so that a microphone support boom pitch axis is a first distance from an external compression application axis, an effective point of application of a microphone support boom frictional force is a second distance from said external compression application axis, and said first distance is greater than said second distance.

25. A microphone support boom movement control apparatus comprising:

a microphone support boom multiple degree of freedom motion control element adapted to control motion of a microphone support boom in at least two degrees of freedom;

an attachment element configured to attach said microphone support boom multiple degree of freedom motion control element to a microphone stand upon engagement of said attachment element with said microphone stand, wherein said attachment element is immobile relative to said microphone stand when said attachment element is fully engaged with said microphone stand, an activatable, microphone support boom yaw isolation element that is operable to isolate yaw of said microphone support boom about a microphone support boom yaw axis from said attachment element when said attachment element is in said fully engaged configuration; and a microphone support boom retention element to which said microphone support boom is responsive, wherein said activatable, microphone support boom yaw isolation element comprises a double opposing conical element and a shell having an inner surface adapted to interface said double opposing conical element.

26. A microphone support boom movement control apparatus as described in claim 25, further comprising a microphone support boom pitch isolation element that comprises a double opposing conical element and a shell having an inner surface adapted to interface said double opposing conical element.

27. A microphone support boom movement control apparatus comprising:

a microphone support boom multiple degree of freedom motion control element adapted to control motion of a microphone support boom in at least two degrees of freedom;

an attachment element configured to attach said microphone support boom multiple degree of freedom motion control element to a microphone stand upon engagement of said attachment element with said microphone stand, wherein said attachment element is immobile relative to said microphone stand when said attachment element is fully engaged with said microphone stand, an activatable, microphone support boom yaw isolation element that is operable to isolate yaw of said microphone support boom about a microphone support boom yaw axis from said attachment element when said attachment element is in said fully engaged configuration; and a microphone support boom retention element to which said microphone support boom is responsive, wherein said microphone support boom multiple degree of freedom motion control element includes a microphone support boom yaw guide element to which a microphone support boom is directionally responsive, and wherein said microphone support boom yaw guide element comprises a substantially circular recessive channel and a substantially ring-shaped key, at least part of which is configured to fit in said substantially circular recessive channel.

28. A microphone support boom movement control apparatus comprising:

a microphone support boom multiple degree of freedom motion control element adapted to control motion of a microphone support boom in at least two degrees of freedom;

an attachment element configured to attach said microphone support boom multiple degree of freedom motion control element to a microphone stand upon engagement of said attachment element with said microphone stand, wherein said attachment element is immobile relative to said microphone stand when said attachment element is fully engaged with said microphone stand, an activatable, microphone support boom yaw isolation element that is operable to isolate yaw of said microphone support boom about a microphone support boom yaw axis from said attachment element when said attachment element is in said fully engaged configuration; and a microphone support boom retention element to which said microphone support boom is responsive, wherein said microphone support boom multiple degree of freedom motion control element includes a microphone support boom yaw guide element to which a microphone support boom is directionally responsive, and wherein said microphone support boom yaw guide element comprises a double opposing conical element and a shell having an inner surface adapted to interface said double opposing conical element.

29. A microphone support boom movement control method comprising the steps of establishing a microphone support boom multiple degree of freedom motion control element to control motion of a microphone support boom in at least two degrees of freedom;

configuring an attachment element to attach said microphone support boom multiple degree of freedom motion control element to a microphone stand upon engagement of said attachment element with said microphone stand;

further configuring said attachment element to be immobile relative to said microphone stand when said attachment element is fully engaged with said microphone stand;

establishing an activatable, microphone support boom yaw isolation element to isolate yaw of said microphone support boom about a microphone support boom yaw axis from said attachment element when said attachment element is in said fully engaged configuration; and establishing a microphone support boom retention element to which said microphone support boom is responsive, wherein said step of establishing a microphone support boom multiple degree of freedom motion control element comprises the step of establishing a microphone support boom multiple degree of freedom motion control element to control at least yaw and pitch of a microphone support boom, wherein said step of establishing an activatable, microphone support boom yaw isolation element includes the step of establishing an adjustable compression application element that is operable to apply and disapply a compressive force acting along a compressive force axis so as to deactivate and activate said activatable, microphone support boom yaw isolation element, respectively, and wherein said step of establishing a microphone support boom movement control apparatus further comprises the step of establishing a preferential, microphone support boom yaw isolation element that is adapted to allow yaw of said microphone support boom before allowing other motion of said microphone support boom, said preferential isolation of yaw provided upon activation of said activatable, microphone support boom yaw isolation element and when said attachment element is fully engaged.

30. A microphone support boom movement control method as described in claim 29, wherein said step of establishing a preferential, microphone support boom yaw isolation element includes the step of establishing a double conical yaw clutch, said step of establishing a double conical yaw clutch itself comprising the steps of:
 (a) establishing a frustum-shaped frictive yaw surface to have a frictive yaw surface angle relative to a frictive yaw surface proximate compressive force axis, and to have a frictive yaw surface axis that is collinear with said microphone support boom yaw axis; and
 (b) establishing a frustum-shaped frictive pitch surface to have a frictive pitch surface angle relative to a frictive pitch surface proximate compressive force axis, and to have a frictive pitch surface axis that is collinear with a microphone support pitch axis,
 wherein said frictive yaw surface angle is greater than said frictive pitch surface angle.

31. A microphone support boom movement control method as described in claim 30, wherein said step of establishing a double conical yaw clutch comprises the step of establishing a nested, double conical yaw clutch.

32. A microphone support boom movement control method as described in claim 29, wherein said step of establishing a preferential, microphone support boom yaw isolation element includes the steps of:
 (a) establishing frictive yaw surfaces that exhibit a yaw surface coefficient of static friction; and
 (b) establishing frictive pitch surfaces that exhibit a pitch surface coefficient of static friction,
 wherein said yaw surface coefficient of static friction is less than said pitch surface coefficient of static friction.

33. A microphone support boom movement control method as described in claim 29, wherein said step of establishing a preferential, microphone support boom yaw isolation element comprises the steps of;
 (a) establishing a yaw rotatable frictive yaw surface to have an effective yaw surface moment arm relative to said microphone support boom yaw axis; and
 (b) establishing a pitch rotatable frictive pitch surface to have an effective pitch surface moment arm relative to said microphone support boom pitch axis,
 wherein said effective yaw surface moment arm is smaller than said effective pitch surface moment arm.

34. A microphone support boom movement control method as described in claim 29, 30, 31, 32, or 33 wherein said step of establishing a microphone support boom multiple degree of freedom motion control element comprises the step of establishing a microphone support boom multiple degree of freedom motion control element to control motion of a microphone support boom also in at least one microphone support boom axial degree of freedom selected from the group of microphone support boom axial degree of freedoms consisting of: microphone support boom axial translation and microphone support boom axial rotation.

35. A microphone support boom movement control method as described in claim 34, wherein said step of establishing a microphone support boom movement control apparatus further comprises the step of establishing a non-preferential microphone support boom axial degree of freedom motion isolation element that is adapted to isolate said motion in at least one microphone support boom axial degree of freedom from said microphone stand after a start of said preferential isolation of yaw.

36. A microphone support boom movement control method as described in claim 35, wherein step of establishing a non-preferential microphone support boom axial degree of freedom motion isolation element comprises the step of establishing at least four frictive microphone support boom axial motion surfaces, at least two of which have a microphone support boom axial degree of freedom motion frictive angle relative to a boom axial motion frictive surface proximate compressive force axis and that is less than said frictive yaw surface angle.

37. A microphone support boom movement control method as described in claim 36, wherein said microphone support boom axial degree of freedom motion frictive angle is less than said frictive pitch angle.

38. A microphone support boom movement control method as described in claim 35, wherein said step of establishing a non-preferential microphone support boom axial degree of freedom motion isolation element comprises the step of establishing at least one frictive microphone support boom axial degree of freedom surface exhibiting a microphone support boom axial degree of freedom surface coefficient of static friction when in static contact with an external surface of said microphone support boom.

39. A microphone support boom movement control method as described in claim 38, wherein said microphone support boom axial degree of freedom surface coefficient of static friction is greater than said yaw surface coefficient of static friction.

40. A microphone support boom movement control method as described in claim 35, wherein said step of establishing a non-preferential microphone support boom axial degree of freedom motion isolation element comprises the step of establishing a clamp configured so that a microphone support boom pitch axis is a first distance from an external compression application axis, an effective point of application of a microphone support boom frictional force is a second distance from said external compression application axis, and said first distance is greater than said second distance.

41. A microphone support boom movement control method comprising the steps of:
 establishing a microphone support boom multiple degree of freedom motion control element to control motion of a microphone support boom in at least two degrees of freedom;
 configuring an attachment element to attach said microphone support boom multiple degree of freedom motion control element to a microphone stand upon engagement of said attachment element with said microphone stand;
 further configuring said attachment element to be immobile relative to said microphone stand when said attachment element is fully engaged with said microphone stand;
 establishing an activatable, microphone support boom yaw isolation element to isolate yaw of said microphone support boom about a microphone support boom yaw axis from said attachment element when said attachment element is in said fully engaged configuration; and
 establishing a microphone support boom retention element to which said microphone support boom is responsive, wherein said step of establishing an activatable, microphone support boom yaw isolation element comprises the step of establishing a double opposing conical element and a shell having an inner surface adapted to interface said double opposing conical element.

42. A microphone support boom movement control method as described in claim 41, further comprising the step of establishing a microphone support boom pitch isolation element that comprises a double opposing conical element and a shell having an inner surface adapted to interface said double opposing conical element.

43. A microphone support boom movement control method comprising the steps of:
   establishing a microphone support boom multiple degree of freedom motion control element to control motion of a microphone support boom in at least two degrees of freedom;
   configuring an attachment element to attach said microphone support boom multiple degree of freedom motion control element to a microphone stand upon engagement of said attachment element with said microphone stand;
   further configuring said attachment element to be immobile relative to said microphone stand when said attachment element is fully engaged with said microphone stand;
   establishing an activatable, microphone support boom yaw isolation element to isolate yaw of said microphone support boom about a microphone support boom yaw axis from said attachment element when said attachment element is in said fully engaged configuration; and
   establishing a microphone support boom retention element to which said microphone support boom is responsive,
   wherein said step of establishing a microphone support boom multiple degree of freedom motion control element includes the step of establishing a microphone support boom yaw guide element to which a microphone support boom is directionally responsive, and
   wherein said step of establishing a microphone support boom yaw guide element comprises the step of establishing a substantially circular recessive channel and a substantially ring-shaped key, at least part of which is configured to fit in said substantially circular recessive channel.

44. A microphone support boom movement control method comprising the steps of:
   establishing a microphone support boom multiple degree of freedom motion control element to control motion of a microphone support boom in at least two degrees of freedom;
   configuring an attachment element to attach said microphone support boom multiple degree of freedom motion control element to a microphone stand upon engagement of said attachment element with said microphone stand;
   further configuring said attachment element to be immobile relative to said microphone stand when said attachment element is fully engaged with said microphone stand;
   establishing an activatable, microphone support boom yaw isolation element to isolate yaw of said microphone support boom about a microphone support boom yaw axis from said attachment element when said attachment element is in said fully engaged configuration; and
   establishing a microphone support boom retention element to which said microphone support boom is responsive,
   wherein said step of establishing a microphone support boom multiple degree of freedom motion control element includes the step of establishing a microphone support boom yaw guide element to which a microphone support boom is directionally responsive, and
   wherein said step of establishing a microphone support boom yaw guide element comprises the step of establishing a double opposing conical element and a shell having an inner surface adapted to interface said double opposing conical element.

45. A microphone support boom movement control usage method comprising the steps of:
   activating an activatable, microphone support boom yaw isolation element so as to isolate yaw of a rotatable attachment element from a microphone stand,
   wherein said activatable, microphone support boom yaw isolation element forms part of a microphone support boom multiple degree of freedom motion control element that is adapted to control motion of a microphone support boom in at least three degrees of freedom; and
   rotatably attaching to full engagement said rotatable attachment element to said microphone stand without rotating said microphone support boom multiple degree of freedom motion control element.

46. A microphone support boom movement control usage method as described in claim 45, further comprising compressively retaining a microphone support boom in a microphone support boom retention element that forms a part of said microphone support boom multiple degree of freedom motion control element.

47. microphone support boom movement control usage method as described in claim 46, further comprising the steps of adjusting an adjustable compression application element so as to enable yaw of said retained microphone support boom upon application of a manual lateral force to said retained microphone support boom without pitch of said retained microphone support boom; and applying said manual lateral force to said retained microphone support boom to cause microphone support boom yaw without causing microphone support boom pitch.

48. A microphone support boom movement control usage method as described in claim 47, further comprising the steps of further adjusting said adjustable compression application element so as to enable yaw of said retained microphone support boom upon application of a manual lateral force to said retained microphone support boom without microphone support boom axial degree of freedom motion of said retained microphone support boom; and applying said manual lateral force to said retained microphone support boom to cause microphone support boom yaw without causing microphone support boom axial degree of freedom motion.

49. A microphone support boom movement control usage method as described in claim 47 or 48, further comprising the steps of further adjusting said adjustable compression application element so as to enable pitch of said retained microphone support boom upon application of a manual vertical force to said retained microphone support boom without microphone support boom axial degree of freedom motion of said retained microphone support boom; and applying said manual vertical force to said retained microphone support boom to cause microphone support boom pitch without causing microphone support boom axial degree of freedom motion.

50. A microphone support boom movement control usage method as described in claim 45, wherein said activatable, microphone support boom yaw isolation element forms part of a microphone support boom multiple degree of freedom motion control element that is adapted to control motion of a microphone support boom in four degrees of freedom.

51. A microphone support boom movement control usage method as described in claim 50, wherein said four degrees of freedom comprise microphone support boom yaw, microphone support boom pitch, microphone support boom axial translation, and microphone support boom axial rotation.

52. A double conical clutch usable as a preferential, microphone support boom degree of freedom motion isolation element, wherein said double conical clutch comprises:
  (a) frictive preferential motion surfaces, at least one of which is frustum-shaped, said frustum-shaped frictive preferential motion surface having a frictive preferential motion surface angle relative to a frictive preferential motion surface proximate compressive force axis, and having a frictive preferential motion surface axis that is collinear with a microphone support boom preferential motion axis; and
  (b) frictive deferential motion surfaces, at least one of which is frustum-shaped, said frustum-shaped frictive deferential motion surface having a frictive deferential motion surface angle relative to a frictive deferential motion surface proximate compressive force axis, and having a frictive deferential motion surface axis that is collinear with a microphone support deferential motion axis,
  wherein said frictive preferential motion surface angle is greater than said frictive deferential motion surface angle,
  wherein said double conical clutch allows motion in a preferred degree of freedom of said microphone support boom before allowing motion of said microphone support boom in any other degree of freedom;
  wherein said double conical clutch isolates said motion in a preferred degree of freedom from a microphone stand.

53. A double conical clutch usable as a preferential, microphone support boom degree of freedom motion isolation element as described in claim 52, wherein said double conical clutch comprises a nested, double conical clutch.

54. A microphone support boom movement control apparatus comprising
  a microphone support boom multiple degree of freedom motion control element adapted to control motion of a microphone support boom in at least two degrees of freedom;
  an attachment element configured to attach said microphone support boom multiple degree of freedom motion control element to a microphone stand upon engagement of said attachment element with said microphone stand,
  wherein said attachment element is immobile relative to said microphone stand when said attachment element is fully engaged with said microphone stand,
  an activatable, microphone support boom yaw isolation element that is operable to isolate yaw of said microphone support boom about a microphone support boom yaw axis from said attachment element when said attachment element is in said fully engaged configuration;
  a microphone support boom retention element to which said microphone support boom is responsive
  a microphone support boom pitch isolation element that comprises a double opposing conical element and a shell having an inner surface adapted to interface said double opposing conical element.

55. A microphone support boom movement control apparatus comprising:
  a microphone support boom multiple degree of freedom motion control element adapted to control motion of a microphone support boom in at least two degrees of freedom;
  an attachment element configured to attach said microphone support boom multiple degree of freedom motion control element to a microphone stand upon engagement of said attachment element with said microphone stand,
  wherein said attachment element is immobile relative to said microphone stand when said attachment element is fully engaged with said microphone stand,
  an activatable, microphone support boom yaw isolation element that is operable to isolate yaw of said microphone support boom about a microphone support boom yaw axis from said attachment element when said attachment element is in said fully engaged configuration; and
  a microphone support boom retention element to which said microphone support boom is responsive,
  wherein said microphone support boom multiple degree of freedom motion control element includes a microphone support boom yaw guide element to which a microphone support boom is directionally responsive,
  wherein said activatable, microphone support boom yaw isolation element comprises said microphone support boom yaw guide element, and
  wherein said microphone support boom yaw guide element comprises a substantially circular recessive channel and a substantially ring-shaped key, at least part of which is configured to fit in said substantially circular recessive channel.

56. A microphone support boom movement control apparatus comprising:
  a microphone support boom multiple degree of freedom motion control element adapted to control motion of a microphone support boom in at least two degrees of freedom;
  an attachment element configured to attach said microphone support boom multiple degree of freedom motion control element to a microphone stand upon engagement of said attachment element with said microphone stand,
  wherein said attachment element is immobile relative to said microphone stand when said attachment element is fully engaged with said microphone stand,
  an activatable, microphone support boom yaw isolation element that is operable to isolate yaw of said microphone support boom about a microphone support boom yaw axis from said attachment element when said attachment element is in said fully engaged configuration; and
  a microphone support boom retention element to which said microphone support boom is responsive,
  wherein said microphone support boom multiple degree of freedom motion control element includes a microphone support boom yaw guide element to which a microphone support boom is directionally responsive,
  wherein said activatable, microphone support boom yaw isolation element comprises said microphone support boom yaw guide element, and wherein said microphone support boom yaw guide element comprises a double opposing conical element and a shell having an inner surface adapted to interface said double opposing conical element.

57. A microphone support boom movement control method comprising the steps of establishing a microphone support boom multiple degree of freedom motion control element to control motion of a microphone support boom in at least two degrees of freedom;

configuring an attachment element to attach said microphone support boom multiple degree of freedom motion control element to a microphone stand upon engagement of said attachment element with said microphone stand;

further configuring said attachment element to be immobile relative to said microphone stand when said attachment element is fully engaged with said microphone stand;

establishing an activatable, microphone support boom yaw isolation element to isolate yaw of said microphone support boom about a microphone support boom yaw axis from said attachment element when said attachment element is in said fully engaged configuration;

establishing a microphone support boom retention element to which said microphone support boom is responsive; and establishing a microphone support boom pitch isolation element that comprises a double opposing conical element and a shell having an inner surface adapted to interface said double opposing conical element.

58. A microphone support boom movement control method comprising the steps of:

establishing a microphone support boom multiple degree of freedom motion control element to control motion of a microphone support boom in at least two degrees of freedom;

configuring an attachment element to attach said microphone support boom multiple degree of freedom motion control element to a microphone stand upon engagement of said attachment element with said microphone stand;

further configuring said attachment element to be immobile relative to said microphone stand when said attachment element is fully engaged with said microphone stand;

establishing an activatable, microphone support boom yaw isolation element to isolate yaw of said microphone support boom about a microphone support boom yaw axis from said attachment element when said attachment element is in said fully engaged configuration; and establishing a microphone support boom retention element to which said microphone support boom is responsive, wherein said step of establishing a microphone support boom multiple degree of freedom motion control element includes the step of establishing a microphone support boom yaw guide element to which a microphone support boom is directionally responsive, wherein said step of establishing an activatable, microphone support boom yaw isolation element comprises said step of establishing a microphone support boom yaw guide element, and wherein said step of establishing a microphone support boom yaw guide element comprises the step of establishing a substantially circular recessive channel and a substantially ring-shaped key, at least part of which is configured to fit in said substantially circular recessive channel.

59. A microphone support boom movement control method comprising the steps of:

establishing a microphone support boom multiple degree of freedom motion control element to control motion of a microphone support boom in at least two degrees of freedom;

configuring an attachment element to attach said microphone support boom multiple degree of freedom motion control element to a microphone stand upon engagement of said attachment element with said microphone stand;

further configuring said attachment element to be immobile relative to said microphone stand when said attachment element is fully engaged with said microphone stand;

establishing an activatable, microphone support boom yaw isolation element to isolate yaw of said microphone support boom about a microphone support boom yaw axis from said attachment element when said attachment element is in said fully engaged configuration; and establishing a microphone support boom retention element to which said microphone support boom is responsive, wherein said step of establishing a microphone support boom multiple degree of freedom motion control element includes the step of establishing a microphone support boom yaw guide element to which a microphone support boom is directionally responsive, wherein said step of establishing an activatable, microphone support boom yaw isolation element comprises said step of establishing a microphone support boom yaw guide element, and wherein said step of establishing a microphone support boom yaw guide element comprises the step of establishing a double opposing conical element and a shell having an inner surface adapted to interface said double opposing conical element.

\* \* \* \* \*